United States Patent
King

(10) Patent No.: US 7,296,989 B2
(45) Date of Patent: Nov. 20, 2007

(54) CONTINUOUS PRODUCTION OF PLASTIC SIDING PANELS WITH SEPARATE SHINGLE APPEARANCE

(75) Inventor: Daniel W. King, Akron, OH (US)

(73) Assignee: MTP, Inc., Middletown, OH (US)

( * ) Notice: Subject to any disclaimer, the term of this patent is extended or adjusted under 35 U.S.C. 154(b) by 301 days.

(21) Appl. No.: 10/999,559

(22) Filed: Nov. 30, 2004

(65) Prior Publication Data

US 2005/0144869 A1    Jul. 7, 2005

Related U.S. Application Data

(60) Continuation-in-part of application No. 10/689,137, filed on Oct. 20, 2003, now Pat. No. 7,008,213, which is a division of application No. 09/919,136, filed on Jul. 31, 2001, now Pat. No. 6,635,218, which is a continuation-in-part of application No. 09/315,317, filed on May 20, 1999, now abandoned.

(60) Provisional application No. 60/086,378, filed on May 22, 1998.

(51) Int. Cl.
 *B29C 51/10* (2006.01)
 *B29C 51/36* (2006.01)

(52) U.S. Cl. ............ 425/326.1; 425/363; 425/388; 425/471

(58) Field of Classification Search ............ 425/326.1, 425/363, 388, 471, 327, 370, 371, 394
See application file for complete search history.

(56) References Cited

U.S. PATENT DOCUMENTS 3,593,479 A * 7/1971 Hinds et al. ................. 52/313
4,130,974 A * 12/1978 Chalmers et al. ............. 52/531
4,329,307 A * 5/1982 Westcott et al. ............. 264/160
4,343,126 A * 8/1982 Hoofe, III ..................... 52/313
4,532,739 A * 8/1985 Cooper ........................... 52/57
4,680,911 A * 7/1987 Davis et al. ................... 52/521
4,822,553 A * 4/1989 Marshall ..................... 264/292
5,034,178 A * 7/1991 Kinugasa et al. ........... 264/510
5,224,318 A * 7/1993 Kemerer ....................... 52/521
5,314,325 A * 5/1994 Bosler ......................... 425/384
5,347,784 A * 9/1994 Crick et al. ................... 52/520
5,575,127 A * 11/1996 O'Neal ........................ 52/520
5,651,227 A * 7/1997 Anderson .................... 52/520

(Continued)

*Primary Examiner*—James P. Mackey
*Assistant Examiner*—Dimple N. Bodawala
(74) *Attorney, Agent, or Firm*—Howard & Howard Attorneys, P.C.

(57) ABSTRACT

A method and an apparatus for continuously producing elongated siding panels is disclosed. The apparatus includes a conveyor, a plurality of mold plates, and a die for extruding a sheet of material onto the mold plates. The mold plates are formed of a rigid material and positioned adjacent one another and supported by the conveyor for forming the elongated siding panels. Each of the mold plates has an upper edge portion and a lower edge portion with an intermediate portion therebetween. The intermediate portion has an aesthetic pattern for imparting the pattern to the sheet of material with the adjacent mold plates having different aesthetic patterns. The lower edge portion has a lower leg extending substantially perpendicular from the intermediate portion defining a horizontal plane and a projection portion between the lower edge portion and the intermediate portion extends beyond the horizontal plane for imparting a jagged pattern to the intermediate portion.

45 Claims, 14 Drawing Sheets

U.S. PATENT DOCUMENTS 5,700,495 A * 12/1997 Kemerer et al. ............. 425/190
5,857,303 A * 1/1999 Beck et al. ................... 52/520
5,906,840 A * 5/1999 Bosler et al. ............... 425/388
5,927,044 A * 7/1999 Lamb et al. ............. 52/745.19
6,319,456 B1 * 11/2001 Gilbert et al. .............. 264/519

* cited by examiner

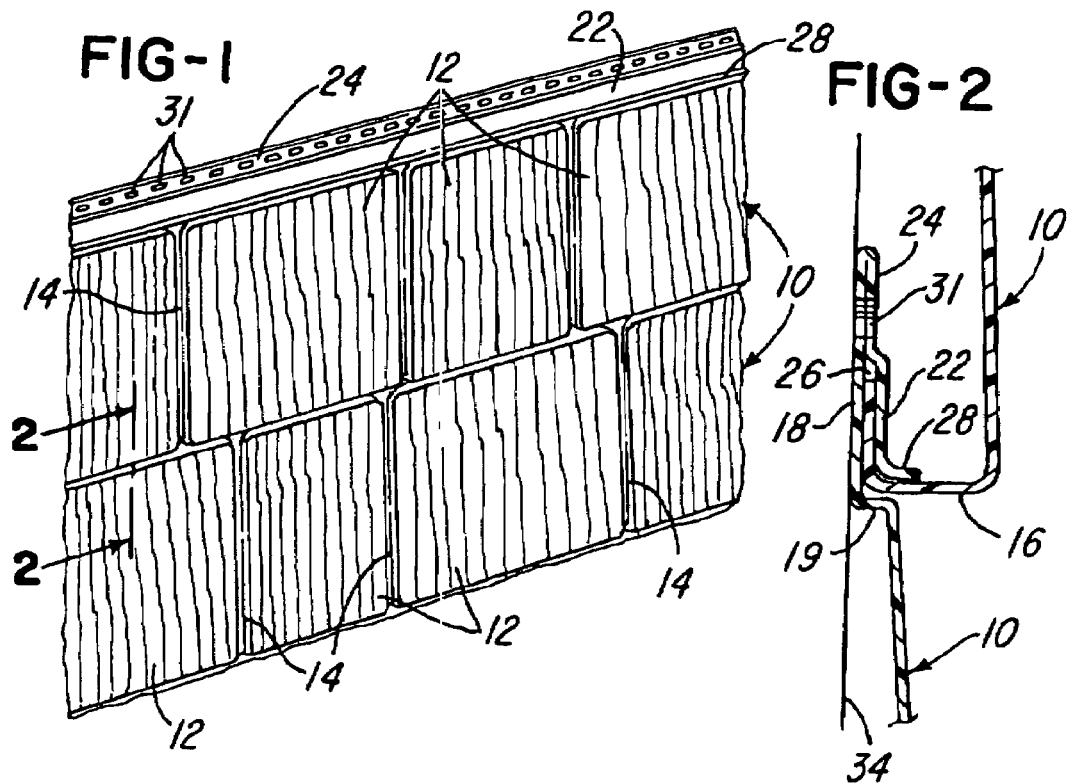
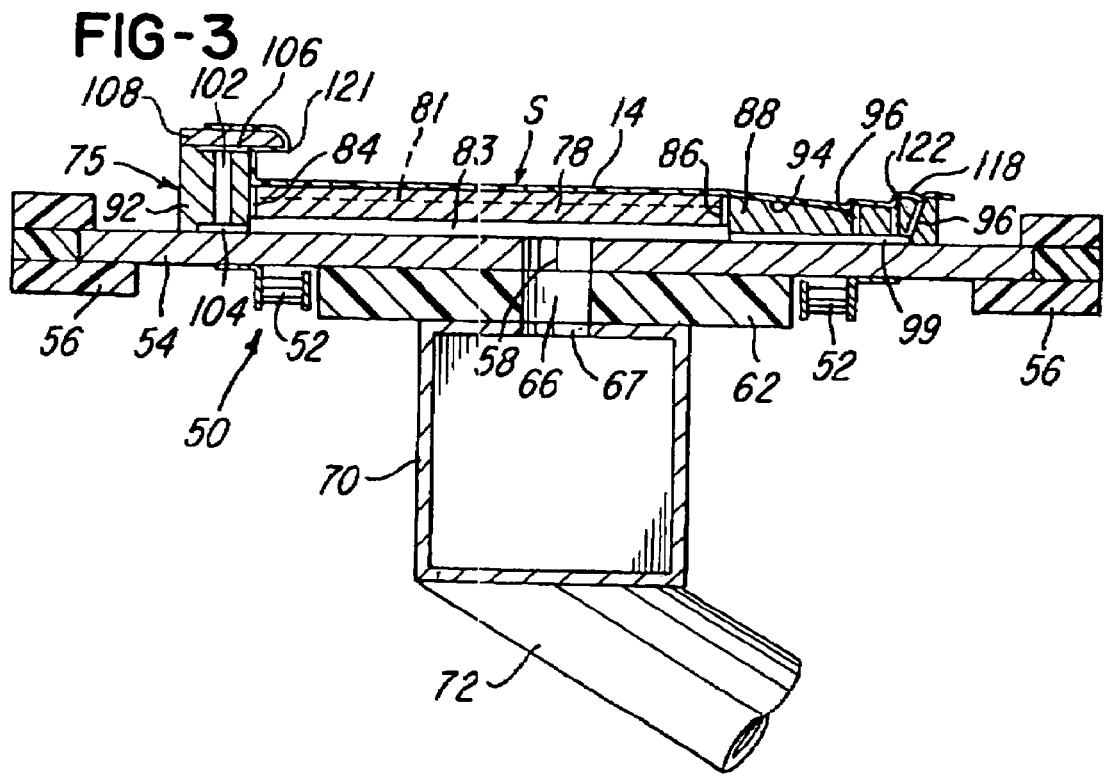

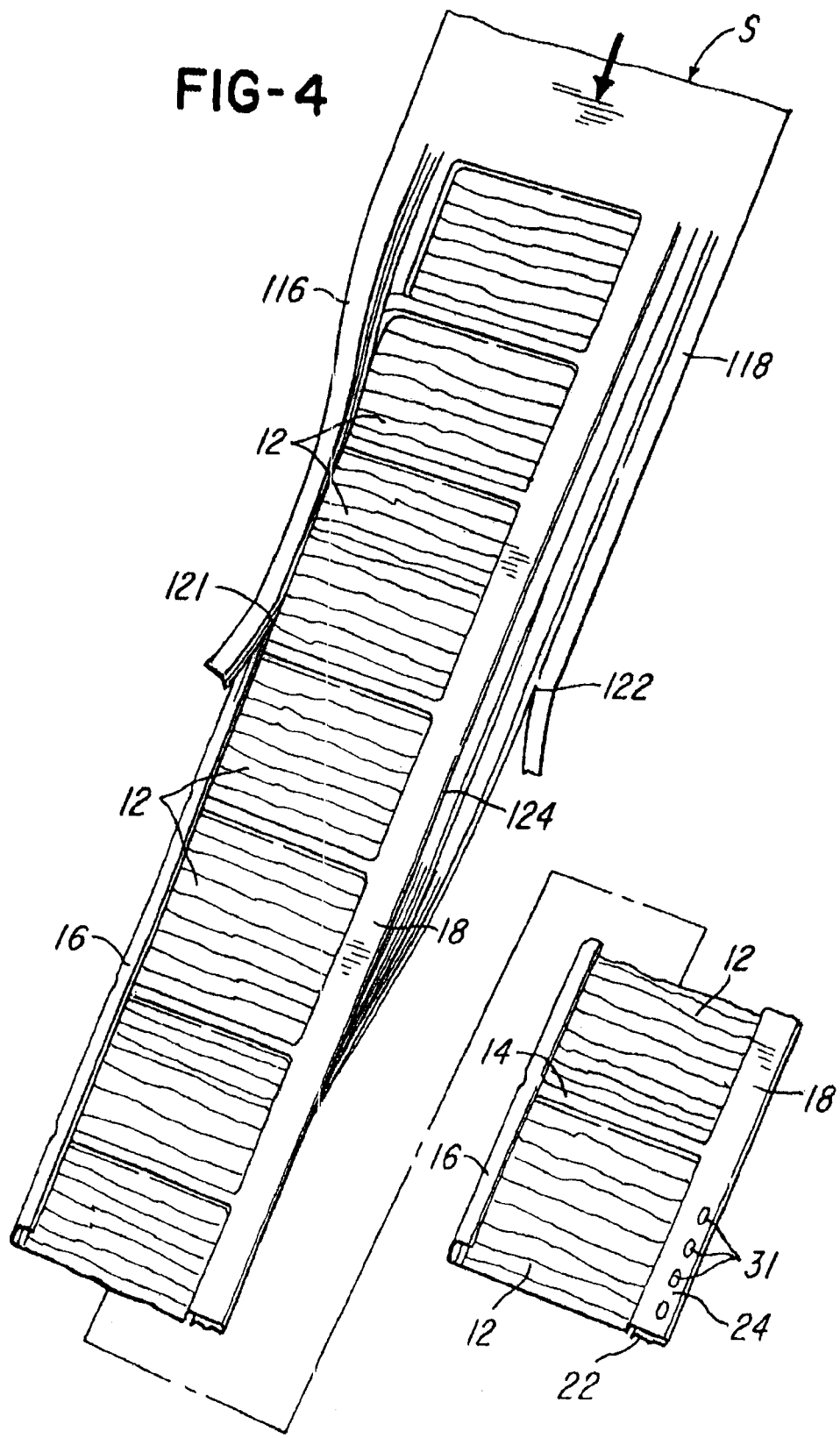

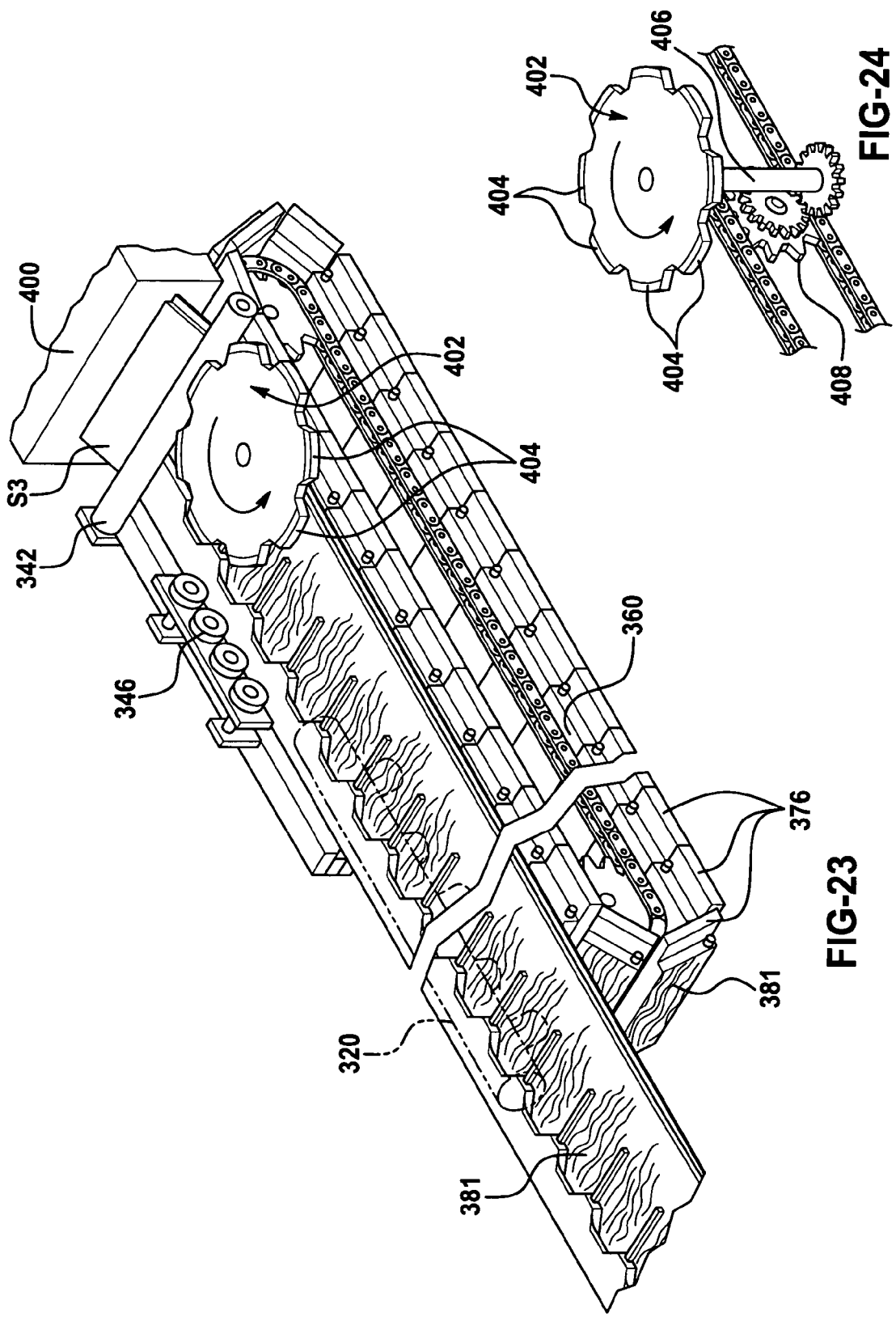

CONTINUOUS PRODUCTION OF PLASTIC SIDING PANELS WITH SEPARATE SHINGLE APPEARANCE

CROSS-REFERENCES TO RELATED APPLICATIONS

"This application is continuation-in-part of U.S. patent application Ser. No. 10/689,137, filed on Oct. 20, 2003, U.S. Pat. No. 7,008,213, which is a divisional of U.S. patent application Ser. No. 09/919,136, filed on Jul. 31, 2001, U.S. Pat. No. 6,635,218, which is a continuation-in-part of U.S. patent application Ser. No. 09/315,317, filed on May 20, 1999, Abandonment, which claims the benefit of U.S. Provisional Patent Application Ser. No. 60/086,378, filed on May 22, 1998."

BACKGROUND OF THE INVENTION

In the production of vinyl siding panels having the appearance of rough-sawn cedar shake shingles, for example, as disclosed in U.S. Pat. Nos. 3,593,479 and 5,455,099, it is known to injection mold the panel or vacuum-form a precut sheet and then trim and punch and form the edge portions of the sheet, to form a hook-shaped lower portion along the panel and an upper portion which defines a groove and forms a nailing flange. It is also known to extrude or form a flat sheet of plastics material and then direct the sheet onto the upper run of an endless flexible belt conveyor for vacuum-forming the sheet, for example, as disclosed in U.S. Pat. Nos. 3,982,868 and 5,314,325. The endless flexible belt is constructed of a porous material and defines cavities into which the hot plastic sheet is sucked by a vacuum source under the upper run of the endless belt. The door sheet is then cooled and cut at longitudinally spaced intervals to produce vacuum-formed garage door panels or other articles. It has been found that the endless flexible conveyor belts for producing vacuum-formed articles are expensive to construct, have a relatively short service life and do not conduct heat rapidly away from the vacuum-form sheet.

SUMMARY OF THE INVENTION

The subject invention provides a method and an apparatus for continuously producing elongated siding panels. The apparatus comprises a conveyor, a plurality of mold plates, and a die for extruding a sheet of material onto the mold plates. The mold plates are formed of a rigid material and positioned adjacent one another and supported by the conveyor for forming the elongated siding panels. Each of the mold plates has an upper edge portion and a lower edge portion with an intermediate portion therebetween. A plurality of vacuum passages are disposed within each of the intermediate portion, the upper edge portion, and the lower edge portion for vacuum-forming the sheet onto the mold plates. The intermediate portion has an aesthetic pattern for imparting the pattern to the sheet of material with the adjacent mold plates having different aesthetic patterns. The lower edge portion has a lower leg extending substantially perpendicular from the intermediate portion defining a horizontal plane and a projection portion between the lower edge portion and the intermediate portion extends beyond the horizontal plane for imparting a jagged pattern to the intermediate portion.

One advantage of the subject invention is that the siding panel has a realistic appearance that is enhanced by the projection portion extending at different amounts beyond the horizontal plane. The projection portion gives the siding panel a jagged appearance which is more similar to actual shake siding. Another advantage of the projection portion is that when the siding panels are fastened to a structure, moisture is not able to get behind the siding panels because the moisture is not able to follow the projection portion. Whereas the moisture does travel along the generally flat bottom of the prior art siding panels and damages the structure. Therefore, it is advantageous that the subject invention does not allow the moisture to travel along the projection portion and behind the siding panels.

BRIEF DESCRIPTION OF THE DRAWINGS

FIG. 1 is a fragmentary perspective view of two overlapping siding panels produced in accordance with one embodiment of the invention;

FIG. 2 is a fragmentary section taken generally on the line 2-2 of FIG. 1;

FIG. 3 is a vertical section through the upper run of an endless vacuum-forming conveyor constructed in accordance with the invention;

FIG. 4 is a perspective view of a plastic sheet being vacuum-formed in accordance with one embodiment of the invention and illustrating the progressive steps for successively producing the panels;

FIG. 23 is a perspective view of another embodiment of the forming station having a plug assist urging the sheet of material into the mold plates;

FIG. 24 is a close-up perspective view of the plug assist illustrated in FIG. 23.

DETAILED DESCRIPTION OF THE INVENTION

Figure 5:
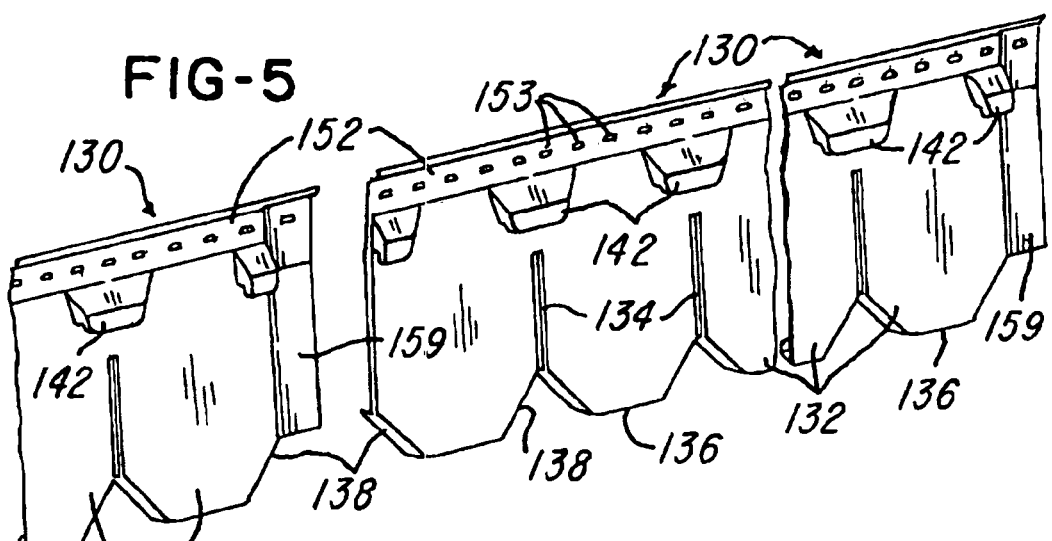
FIG. 5 is a fragmentary perspective view of portions of two siding panels constructed in accordance with another embodiment of the invention.

FIG. 1 illustrates portions of two elongated siding panels 10 connected together as shown in FIG. 2, and each siding panel has a length of about five feet. Each siding panel is formed from a sheet of rigid plastics material such as polyvinylchloride or "vinyl" and includes a series of ten generally rectangular shingle panels 12 each having a different and distinct wood grain appearance. The shingle panels 12 are integrally connected by flat recessed strip portions 14 defining grooves, and each panel 10 has a longitudinally extending hook-shaped lower portion 16 (FIG. 2). Each panel 10 also has a longitudinally extending upper flange portion 18 which extends from a step or shoulder portion 19 and is integrally connected to a folded-over flange portion 22.

The folded-over flange portion 22 cooperates with the flange portion 18 to form a double wall nailing flange 24 and a slot or groove 26 for receiving and retaining the hook-shaped lower edge portion 16 of the above overlapping panel 10. The folded-over flange portion 22 has a bottom lip 28 which is spaced above the shoulder portion 19 to facilitate inserting the hook-shaped lower edge portion 16 into the groove 26. As also shown in FIGS. 1 and 2, the upper nailing flange 24 of each panel 10 has a series of longitudinally spaced slots 31 for receiving longitudinally spaced nails which attach the panel 10 to a vertical wall surface 34.

Referring to FIGS. 3 and 4, the siding panels 10 are continuously produced from a flat sheet S of plastics material or polyvinylchloride which has a substantially uniform thickness and which is produced by a flat sheet die on a plastics extruder (not shown), as well known in the art. The hot vinyl sheet S from the extruder is directed onto the top or upper run of an endless vacuum-forming machine or conveyor 50 (FIG. 3). The conveyor includes a pair of endless flexible length chains 52 which carry a continuous series of separate aluminum carrier plates or slats 54, with one carrier slat corresponding to one of the shingle panels 12. The opposite end portions of each carrier slat 54 are guided along the upper run of the endless conveyor by a pair of opposing guide tracks or rails 56 each constructed of a set of strips of solid low friction plastics materials.

Each of the rectangular carrier slats 54 has a center hole 58, and the slats are supported for horizontal sliding movement along a set of stationary elongated support plates 62 each constructed of a low friction solid plastics material. As the continuous series of carrier slats 54 move along the top surface of the support plates 62, the holes 58 align with longitudinally extending slots 66 within the support plates 62. The slots 66 connect with corresponding slots 67 within the top wall of a longitudinally extending suction or vacuum manifold 70 connected by longitudinally spaced tube 72 to a vacuum source or pump.

Each of the carrier slats 54 has a width equal to the width of the corresponding shingle panel 12 plus one of the separator strip portions 14. A shingle mold plate 75 has the same width as its corresponding carrier slat 54 and is secured to its carrier slat 54 by a set of screws (not shown) extending through the slat 54 and threaded into the mold plate 75. Each mold plate 75 includes a rectangular intermediate section 78 defining a recessed cavity 81 having a wood grain surface texture corresponding to the desired wood grain appearance on the corresponding shingle 12. The intermediate section 78 of each mold plate 75 has a bottom vacuum cavity 83 which connects the center vacuum hole or passage 58 to narrow vacuum slots 84 and 86 at opposite ends of the mold section 78 and to a top mold section 88 and a bottom mold section 92. The top mold section 88 has a stepped top surface 94 and three rows of small holes or passages 96 which extend from steps in the top surface to a vacuum cavity or passage 99 formed in the bottom of the mold section 88 and connected to the vacuum passage 83.

The bottom section 92 of each mold plate 75 has a set of longitudinally spaced holes 102 which connect a vacuum passage 104 extending from the vacuum passage 83 to a vacuum passage 106 under a cap plate 108. Thus, the suction or partial vacuum within the manifold 70 creates a vacuum within the passages 83, 84, 86, 99, 104 and 106 and the holes 96 and 102 within each mold plate 75 as the mold plate and its supporting carrier slat 54 move along the stationary support plates 62.

Referring to FIG. 4, as the hot extruded sheet S progressively contacts the succession of mold plates 75 which move along the upper run of the endless conveyor 50 at a speed corresponding to the extrusion rate for the sheet S, the longitudinal center portion of the sheet is progressively sucked into the cavities 81 to form the shingle panels 12, and the lower and upper portions of the sheet S are progressively sucked into the undercut cavities defined by the bottom mold sections 92 and cap members 108 and onto the stepped surfaces 94 of the top sections 88 of the mold plates 75 to provide the sheet with a cross-sectional configuration as shown in FIG. 3.

After the sheet S is vacuum-formed within the mold plates 75 and is cooled as the sheet moves along the top run of the conveyor with the aid of air blowers and/or water streams directed against the moving carrier slats 54, the opposite edge portions 116 and 118 of the sheet are trimmed from the vacuum-formed sheet by cutting or slitting the sheet at the corners 121 and 122 (FIG. 3). The separated portions or trim of the edge portions 116 and 118 are directed into a suitable scrap chopper (not shown) for reducing the trim into fine particles which are conveyed back to the material supply hopper for the extruder.

After the trimming operation, the vacuum-formed sheet is reheated along a line or the step 124, and the outer stepped flange portion 118 of the sheet is progressively folded back onto the flange portion 18 to form the cross-sectional configuration for the upper edge portion of the panel, as shown in FIG. 2. The double wall nailing flange 24 is then progressively punched with the longitudinally spaced slots 31. As the vacuum-formed strip or sheet continues to move horizontally after the slots 31 are punched, the sheet is cut laterally at longitudinally spaced intervals, for example, intervals of 5 feet, for successively producing the siding panels 10 which are ready for installation.

Figure 6:
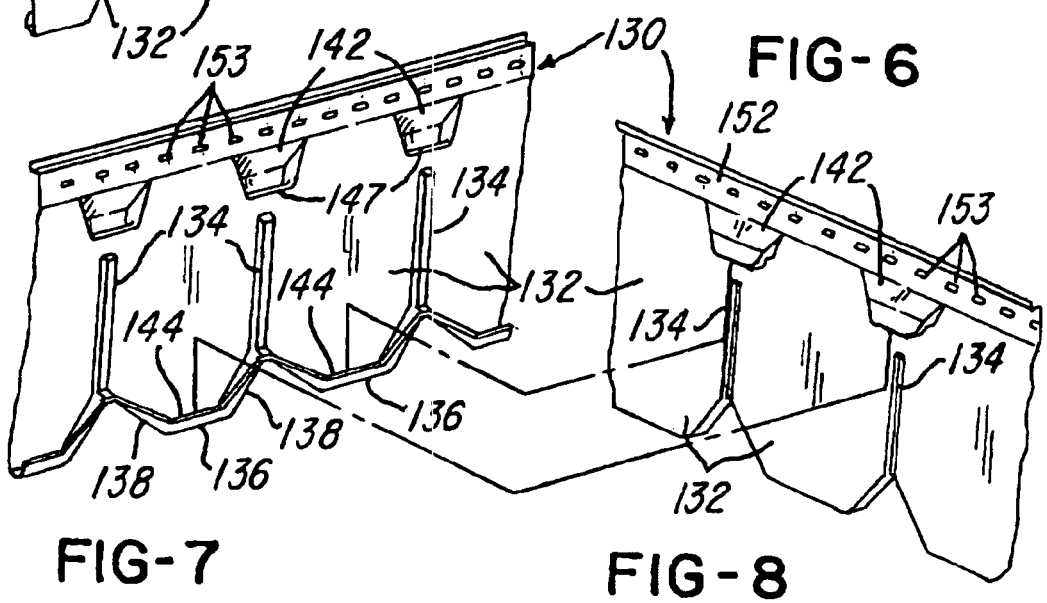
FIG. 6 is a perspective view of portions of the siding panels shown in FIG. 5 and illustrating the connection of adjacent overlapping panels.
Figure 7:
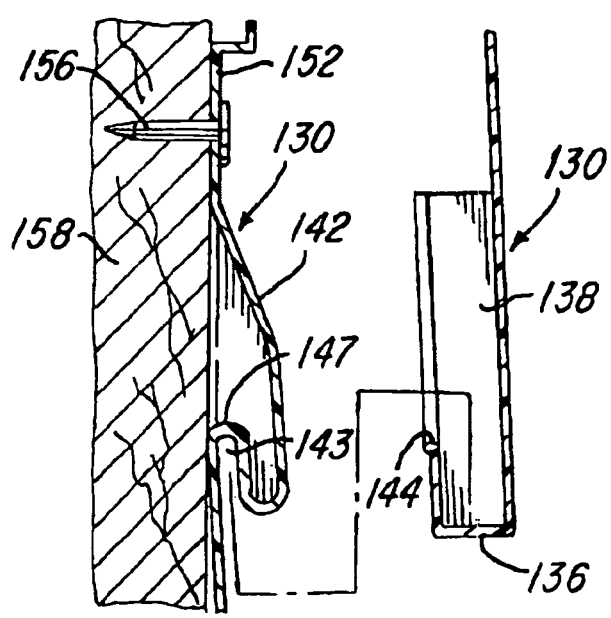
FIGS. 7 and 8 are fragmentary sections showing the assembly of the siding panels shown in FIGS. 5 and 6.
Figure 8:
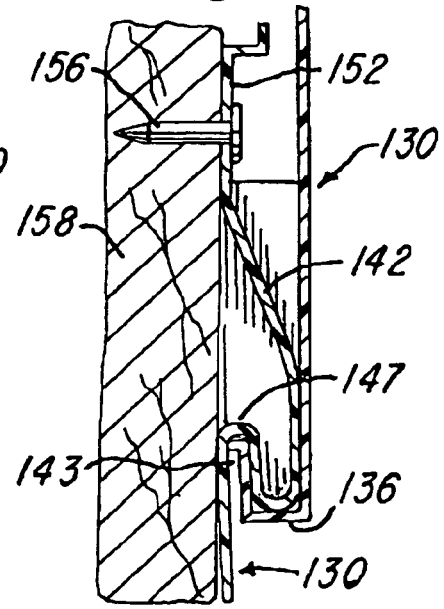

Referring to FIGS. 5-8, siding panels 130 are continuously produced by vacuum-forming endless conveyor apparatus in accordance with the invention, and each siding panel 130 includes a series of integrally connected shingle panels 132 separated by grooves formed by strip portions 134. Each shingle panel 132 has a wood grain pattern and a hook-shaped bottom portion 136 connecting tapering hook-shaped inclined portions 138 to provide each shingle panel 132 with generally a partial octagonal configuration. Each siding panel 130 also includes an upper portion having a series of longitudinally spaced and outwardly projecting tabs or projections 142 which are vertically aligned with the strip portions 134 and define corresponding undercut grooves 143 (FIG. 7) for receiving the hook-shaped bottom portions 136 of the shingle panels 132 of an overlapping siding panel 130. As shown in FIG. 6, the hook-shaped bottom portion 136 of each shingle panel 132 has a straight upper edge 144 and each projecting tab 142 has a straight horizontal edge 147 at the upper end of the corresponding groove 143. This provides for a positive and accurate connection of vertically adjacent overlapping siding panels 130, as shown in FIG. 8. The upper portion of each siding panel 130 also has a longitudinally extending continuous nailing flange 152 having longitudinally spaced slots 153 for receiving fasteners, such as the nails 156 (FIG. 8), for attaching each siding panel 130 to a vertical wall 158. At opposite ends of each panel 130, the projections 142 are half size, and a flange 159 projects from one end of each panel 130.

Figure 9:
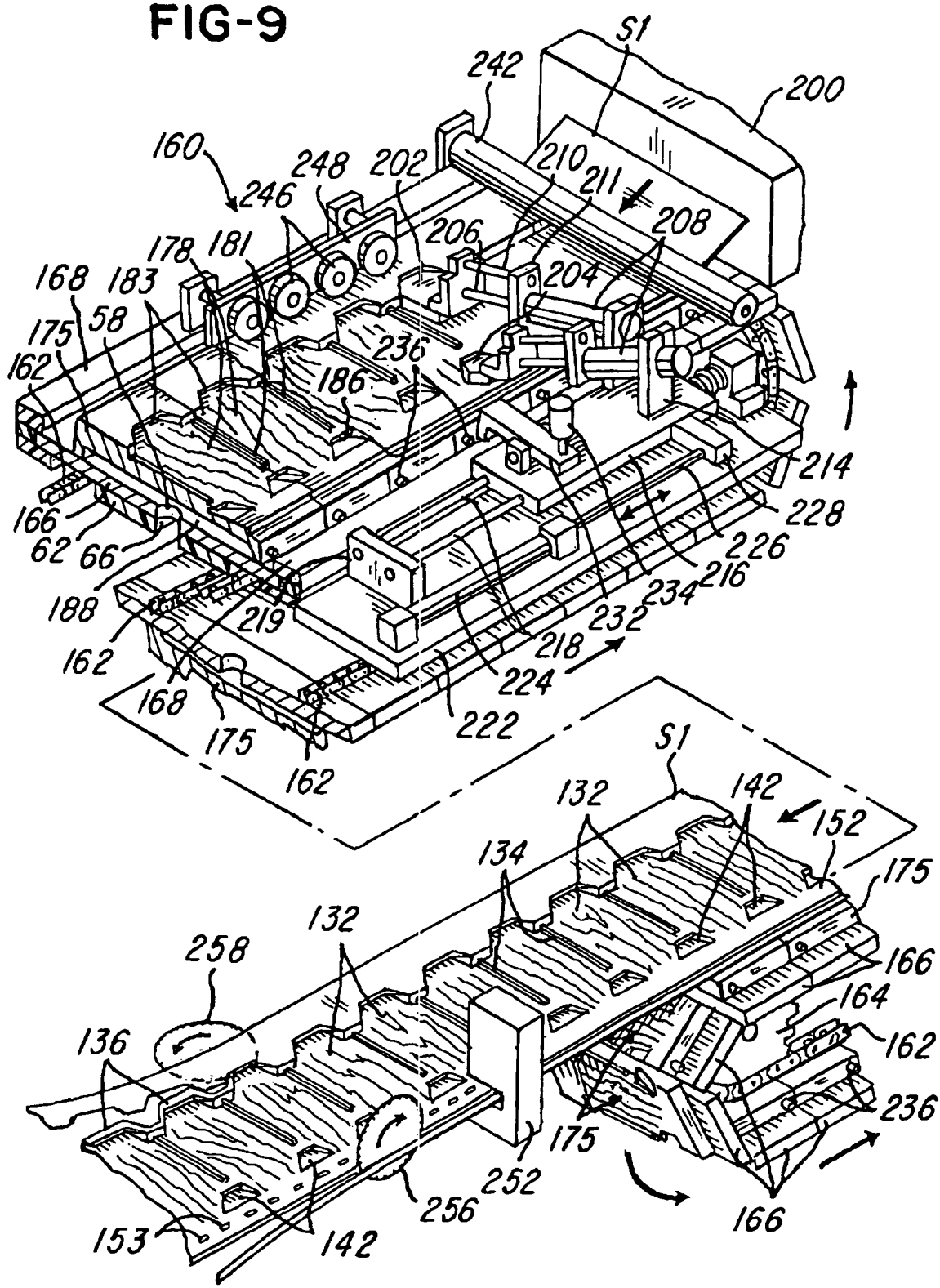
FIG. 9 is a fragmentary perspective view of vacuum-forming apparatus constructed in accordance with the invention for continuously forming the siding panels shown in FIGS. 5-8.
Figure 10:
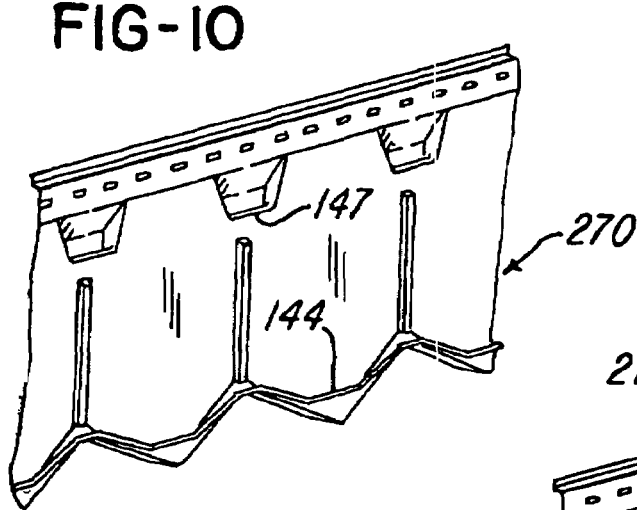
FIGS. 10-14 are fragmentary perspective views of different interchangeable siding panels produced with apparatus constructed as shown in FIG. 9.
Figure 11:
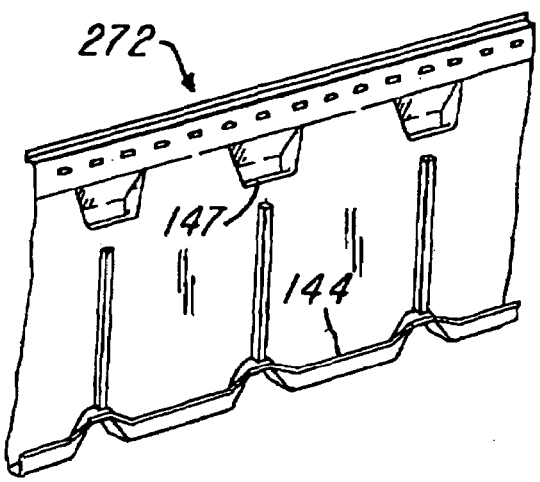
Figure 12:
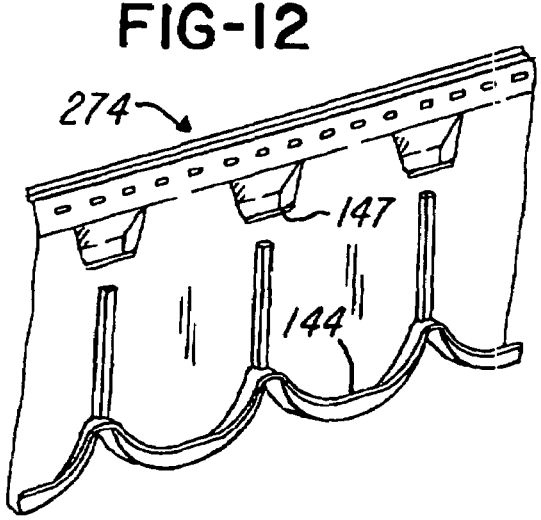
Figure 13:
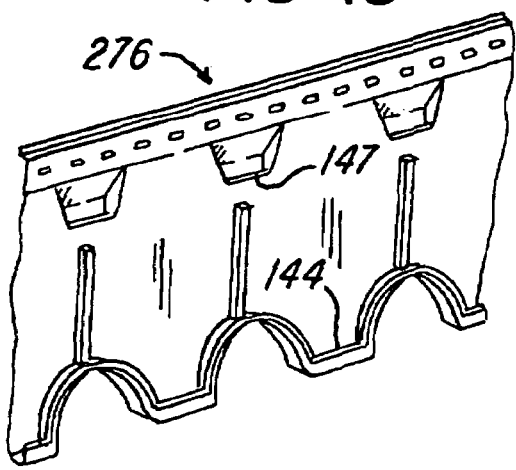
Figure 14:
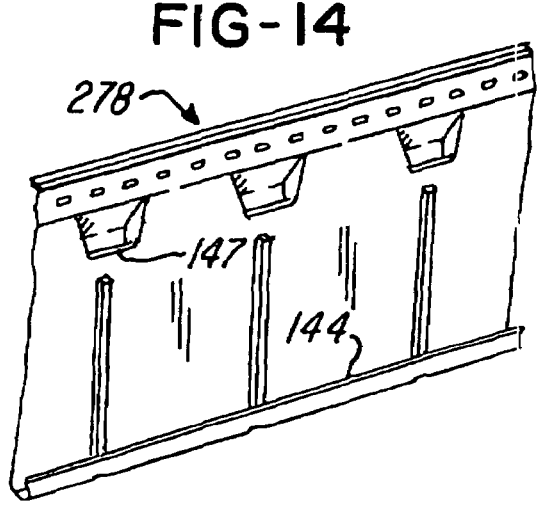

Referring to FIG. 9, a series of the siding panels 130 are continuously produced by a vacuum-forming endless conveyor machine or apparatus 160 which is generally constructed as described above in connection with FIG. 3 for continuously producing the siding panels 10. The machine 160 includes a pair of endless conveyor chains 162 which are constructed the same as the conveyor chains 52 and are directed about a corresponding set of sprockets 164 mounted on parallel spaced shafts (not shown) located at opposite ends of the machine 160. A series of rectangular aluminum slats 166 are constructed the same as the slats 54 and are attached to the conveyor chains 162, and the opposite end portions of the slats 166 are guided by an opposing set of parallel spaced guide tracks or rails 168 which are constructed the same as the guide rails 56 shown in FIG. 3. As also described above in connection with FIG. 3, the conveyor slats 166 are supported along the upper run of the conveyor by the support plate 62 having longitudinally spaced slots 66 which connect with the vacuum manifold 70. Each of the slats 166 has a center hole 58 which aligns with the slots 66 as the slats 166 slide horizontally on top of the support plate 62 for creating a continuous vacuum above each conveyor slat 166.

A series of aluminum mold plates 175 are attached to corresponding conveyor slats 166 in the same manner as the mold plates 75 are attached to the conveyor slats 54 described above in connection with FIG. 3. Each mold plate 175 has a shingle forming cavity 178 with the impression of a wood grain shingle and a border rib 181 which mates with the border rib 181 of the adjacent mold plate 175 to form the groove defining strip portions 134 between the shingle panels 132. Each of the mold plates 175 also has an undercut cavity 183 configured to form the bottom hook portions 136 and 138 of each shingle panel 132. As also shown in FIG. 9, each adjacent pair of abutting mold plates 175 cooperate to define another undercut cavity 186 which is configured to form the projecting tab 142 and undercut groove 143 in vertical alignment with each strip portion 134, as shown in FIG. 5. Each mold plate 175 has small vacuum passages (not shown) which connect the cavities 178, 183 and 186 to a vacuum cavity 188 formed within the bottom of each mold plate in the same manner and for the same purpose as the vacuum cavity or chamber 83 described above in connection with FIG. 3.

As shown in FIG. 9, a generally flat sheet S1 of thermoplastic material or PVC is continuously extruded from an extruder head 200 onto the mold plates 175 which form the upper linear run of the endless conveyor vacuum-forming machine 160, and the vacuum created within the cavities 178, 183 and 186 immediately sucks the hot sheet S1 into the cavities. As the hot sheet S1 is sucked into the vacuum mold plates 175, a set of vacuum-forming assist members or plugs 202 and 204 are quickly extended or inserted into the corresponding cavities 183 and 186 and then quickly retracted to assure that the plastic sheet S1 completely fills the cavities to form the portions 136 and 142 of each single panel 132. Each of the vacuum assist plugs 202 and 204 is supported for reciprocating movement on an incline by a corresponding piston rod 206 extending from a fluid or air cylinder 208 and by a corresponding guide rod 210 which reciprocates in a guide block 211 mounted on the outer end of the corresponding cylinder 208.

Each of the air cylinders 208 is supported by a corresponding plate or bracket 214 projecting upwardly from a carriage member or platform 216. The carriage platform 216 is supported for horizontal reciprocating movement by a pair of slides or guide rods 218 extending between a pair of support plates 219 mounted on a stationary support plate 222. A fluid or air cylinder 224 is also mounted on the plate 222 and has a piston rod 226 connected to an arm 228 projecting laterally from the carriage platform 216. An L-shaped locking or actuator arm or lever 232 is pivotally supported by the carriage platform 216 and is pivoted by a fluid or air cylinder 234. The locking or actuating lever 232 releasably and successively engages a series of actuating pins 236 projecting laterally or horizontally from the mold plates 175.

In operation of the endless conveyor vacuum-forming machine 160 for continuously producing the siding panels 130, the continuously extruded sheet S1 of PVC is directed under a guide roller 242 and onto the continuously moving mold plates 175 forming the upper run of the endless conveyor or machine 160. The speed of the conveyor machine is controlled to match the speed of the sheet S1, and the intermediate portion of the sheet is progressively sucked into the shingle cavities 178 and into the undercut cavities 183 and 186 of the mold plates. The vacuum assist plugs 202 and 204 are quickly and simultaneously extended by actuation of the cylinders 208 and press the portions of the hot sheet within the undercut cavities 183 and 186 further into the cavities. Thus, the plugs assist the vacuum within the cavities for forming the undercut U-shaped portions 136 and 138 of the siding panels within the lower portion of the sheet and also form the projecting tabs 142 and the undercut grooves 143 within the upper portion of the sheet.

The plugs 202 and 204 travel with the vacuum-formed sheet S1 by movement of the carriage platform 216 in response to actuation of the air cylinder 234 to tilt the lever 232 for engaging a moving pin 236 on the conveyor. As soon as the vacuum assist plugs 202 and 204 are retracted, the tilting lever 232 disengages with the pin 236, and the carriage platform 216 returns to the right in FIG. 9 to its home position by the biasing force exerted by the air cylinder 224 to extend its piston rod 226. The timing of the actuation of the cylinders 208 and the cylinder 234 is controlled by electrically actuated valves (not shown) in time relation with the linear movement of the mold plates 175 on the endless conveyor chains 162.

As also shown in FIG. 9, as the intermediate portion of the sheet S1 is progressively vacuum formed into the mold plate cavities, the lower edge portion of the sheet is held against the top surfaces of the mold plates by a series of hold-down rollers 246 supported by a horizontally adjustable bar 248. After the continuously moving vacuum-formed sheet S1 is somewhat cooled on the conveyor mold plates 175 by conducting heat from the mold plates and is stripped from the mold plates, as shown in FIG. 9, the upper edge portion of the continuously moving vacuum-formed sheet is progressively punched by conventional punch and die machine 252 to form the longitudinally spaced slots 153, after which the upper portion of the sheet is trimmed by a rotating vertical saw blade 256. Simultaneously, the lower portion of the strip is trimmed by a horizontal circular saw blade 258 which is positioned to form the hook-shaped lower edge portions 136 and 138, thereby completing the continuous forming of the siding panels 130. Downstream of the saws 256 and 258, the continuous strip of integrally connected siding panels 130 is cut transversely at longitudinally spaced predetermined intervals, such as five feet, by a traveling reciprocating circular saw for successively producing the separate siding panels 130.

Referring to FIGS. 10-14, by interchanging the mold plates 175 on the conveyor slats 166, siding panels having shingle panels with different bottom contours or configurations and different wood grain patterns may be continuously produced on the vacuum-forming machine 160 in place of the siding panels 130. For example, a siding panel 270 (FIG. 10) having shingle panels with a partial hexagon bottom configuration, a siding panel 272 (FIG. 11) having shingle panels with mitered bottom corners, a siding panel 274 (FIG. 12) having shingle panels with a rounded bottom configuration, a siding panel 276 having shingle panels with a half cove bottom configuration or a siding panel 278 (FIG. 14) having shingle panels with a square bottom configuration may each be continuously produced on the apparatus or machine 160 simply by selecting the corresponding interchangeable mold plates 175. In each of the siding panels, the lower hook-shaped bottom portion of each shingle panel has a straight edge 144, and each projecting tab has a straight edge 147 defining an undercut groove, in the same location and with the same spacing therebetween as the straight edges 144 and 147 described above in connection with the siding panels 130. As a result, all of the siding panels 130, 270, 272, 274, 276 and 278 are interchangeable which permits various combinations of the siding panels to be attached to a vertical wall surface.

From the drawings and the above description, it is apparent that the continuous production of vacuum-formed siding panels in accordance with the invention, provides desirable features and advantages. For example, the continuous forming of the extruded flat sheet S or S1 with the continuous succession of mold plates 75 or 175 on the endless conveyor 50 or 160, provides for efficiently and economically producing the siding panels with different shingle panels each having sharp detail and one or more undercut portions. The close fitting aluminum mold plates along the upper run of the conveyor also efficiently and precisely form the lower and upper portions of each siding panel. The separate aluminum mold plates further provide the conveyor or machine with a long service life for producing a large volume of siding panels, and the mold plates may be rapidly cooled by cooling water or air during the continuous production of the siding panels. The vacuum-forming assist plugs 202 and 204 which travel with the sheet S1, also help in producing precision shingle panels with precision undercut portions.

Figure 15:
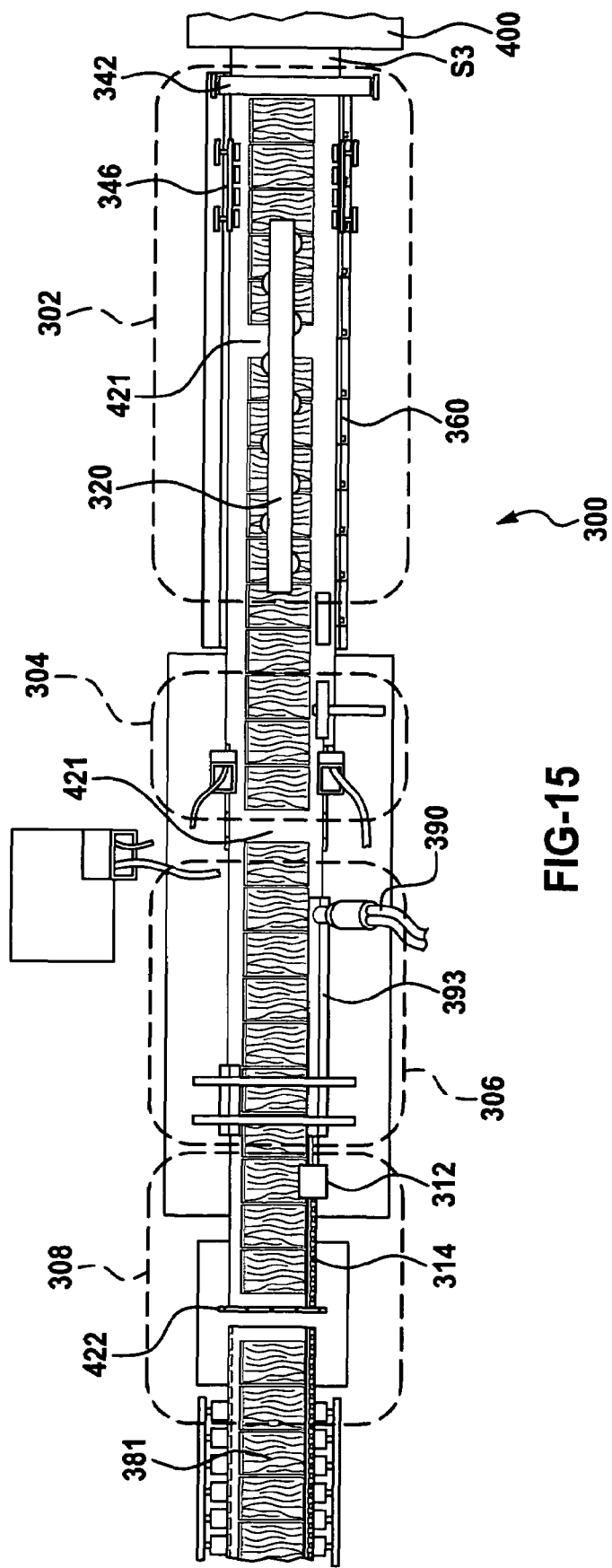
FIG. 15 is a schematic view of one embodiment of an assembly having for forming elongated siding panel.
Figure 16:
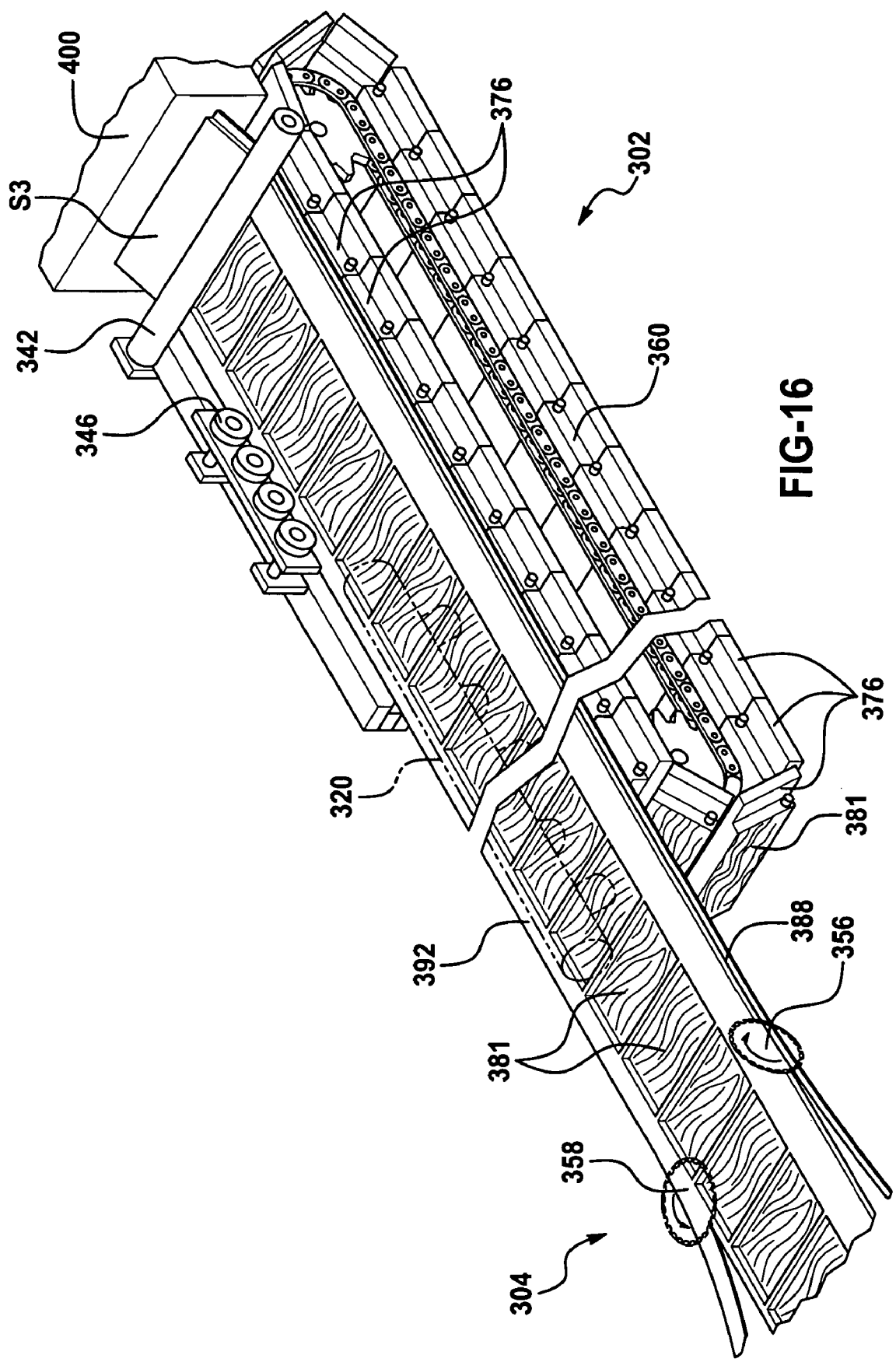
FIG. 16 is a perspective view of a forming station including an extruder extruding a sheet of material directed onto mold plates carried by a conveyor for vacuum-forming.

Referring to FIG. 15, another embodiment of an apparatus for continuously producing elongated siding panels 310 is illustrated generally at 300. The apparatus 300 includes a forming station 302, a trimming station 304, a bending station 306, and a finishing station 308. The forming station 302 is shown generally in FIG. 16 and includes a conveyor 360, a plurality of mold plates 376, and an extruder die 400 for extruding a sheet of material S3 onto the mold plates 376. A guide roller 342 directs the sheet of material S3 onto the plates 376 and material rollers 346 ensure that the material S3 is in contact with the mold plates 376. The conveyor 360 is preferably an endless conveyor belt; however, other types of conveyors may accommodate the subject invention.

After the sheet of material S3 has been vacuum formed and while still traveling on the conveyor 360, a plurality of coolers 320 cool the entire sheet of material S3 below the temperature for vacuum forming. A lower edge portion 392 and an upper edge portion 388 are both formed while the sheet of material S3 is above the temperature for vacuum forming. Preferably, the entire lower edge portion 392 is formed prior to being removed from the conveyor 360 and while the sheet of material S3 is above the temperature for vacuum forming. At the end of the conveyor 360, the sheet of material S3 is removed from the mold plates 376 and is below the temperature for vacuum forming.

After the sheet of material S3 has been removed, the trimming station 304 trims excess material S3 from both the lower edge portion 392 and the upper edge portion 388, if necessary. The lower edge portion 392 may be formed without excess material S3 so the lower edge portion 392 may not require trimming. The trimming station 304 may include circular-type saws, knives, slicers, or the like. The trimming station 304 includes a horizontal blade 358 for trimming the lower edge portion 392 and a vertical blade 356 for trimming the upper edge portion 388. Depending upon the orientation of the sheet of material S3, those skilled in the art appreciate that the blades may be positioned differently while still practicing the subject invention.

The mold plates 376 are formed of a rigid material and are positioned adjacent one another. In one embodiment, the mold plates 376 are cast of aluminum. The mold plates 376 are supported by the conveyor 360 and form the elongated siding panels 310 from the extruded sheet of material S3.

Figure 17A:
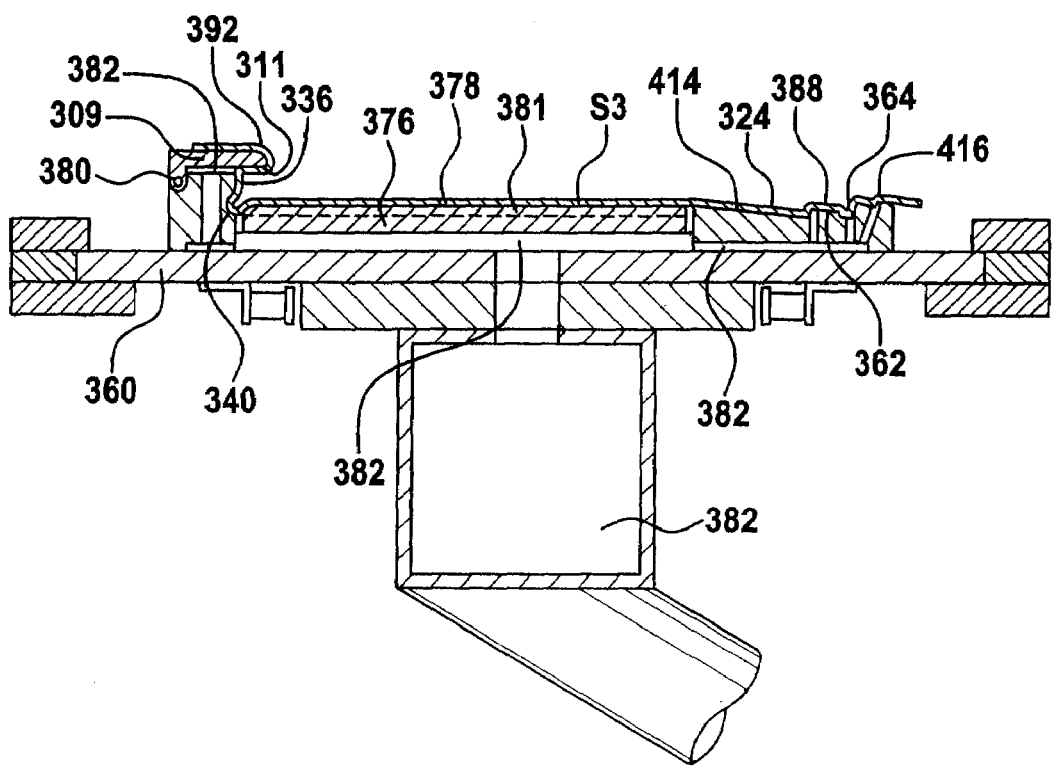
FIG. 17A is a cross-sectional view of one embodiment of the mold plates having the sheet of material disposed thereon.
Figure 18A:
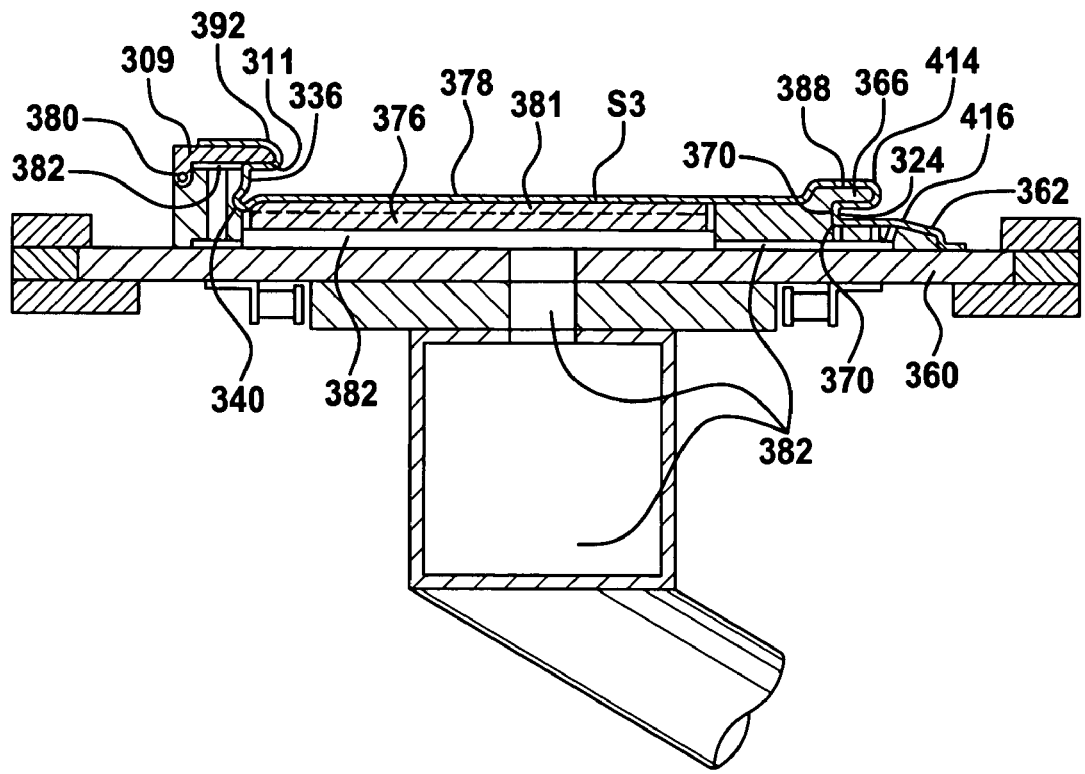
FIG. 18A is a cross-sectional view of another embodiment of the mold plates having the sheet of material disposed thereon.

Referring to the formation of the upper and the lower edge portions 388, 392, FIGS. 17A and 18A show cross-sectional views of the mold plates 376 having the sheet of material S3 disposed thereon. Each of the mold plates 376 has the upper edge portion 388 and the lower edge portion 392 with an intermediate portion 378 therebetween. A plurality of vacuum passages 382 are disposed within each of the intermediate portion 378, the upper edge portion 388, and the lower edge portion 392 for vacuum-forming the sheet of material S3 onto the mold plates 376.

The intermediate portion 378 has an aesthetic pattern 381 for imparting the pattern to the sheet of material S3. The mold plates 376 are arranged on the conveyor 360 so that the mold plates 376 adjacent one another have different aesthetic patterns 381. This allows the siding panels 310 to achieve a realistic appearance while in use. For example, the conveyor 360 may carry eighty mold plates 376, but when the elongated siding panel 310 is sectioned into desired lengths, only eight mold plates 376 form the sectioned panel, such as for a five-foot panel. Therefore, the eight mold plates 376 adjacent one another have different aesthetic patterns 381 to improve the realistic appearance of the sectioned panel.

The lower edge portion 392 has a lower leg 336 extending substantially perpendicular from the intermediate portion 378 defining a horizontal plane. The lower leg 336 is collinear along each of the adjacent mold plates 376 to allow for alignment between adjacent siding panels 310. A projection portion 340 between the lower edge portion 392 and the intermediate portion 378 extends beyond the horizontal plane and imparts a jagged pattern to the intermediate portion 378. The jagged pattern also enhances the realistic appearance of the siding panel 310. Another advantage of the projection portion 340 is that when the siding panels 310 are fastened to a structure 350, moisture is not able to get behind the siding panels 310. Said another way, moisture is not able to follow the projection portion 340 because of the angle, whereas the moisture does travel along the generally flat bottom of the prior art siding panels 310. Any moisture that is trapped behind the siding panels 310 may damage the structure 350, therefore, it is advantageous that the subject invention does not allow the moisture to travel behind the siding panels 310.

Figure 17B:
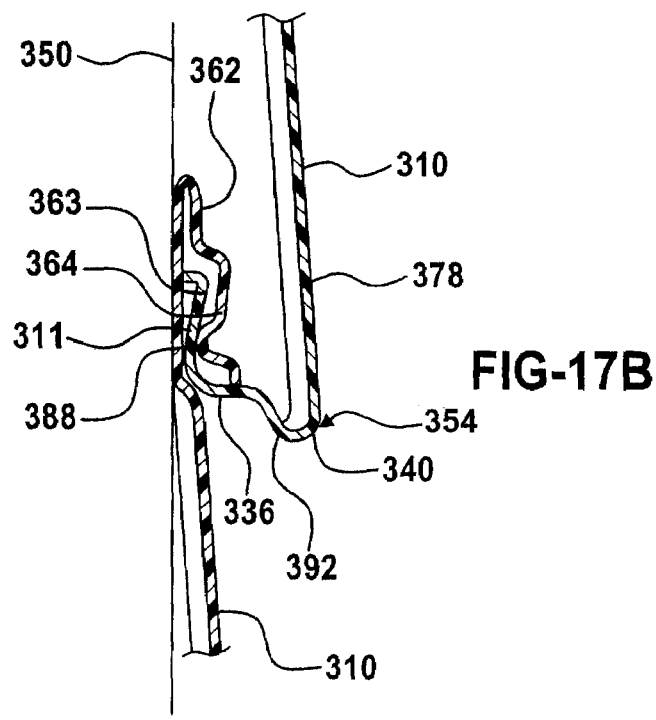
FIG. 17B is a cross-sectional view of siding panels shown in FIG. 17A and illustrating the connection of adjacent overlapping panels.

Referring to FIG. 17B, the projection portion 340 is illustrated as angling upwardly at an angle of less than ninety degrees from the intermediate portion 378 toward the lower leg 336. The projection portion 340 is also illustrated as having a rounded nose 354; however, the projection portion 340 may terminate in a point to further decrease the likelihood of the moisture traveling behind the siding panels 310.

Figure 17C:
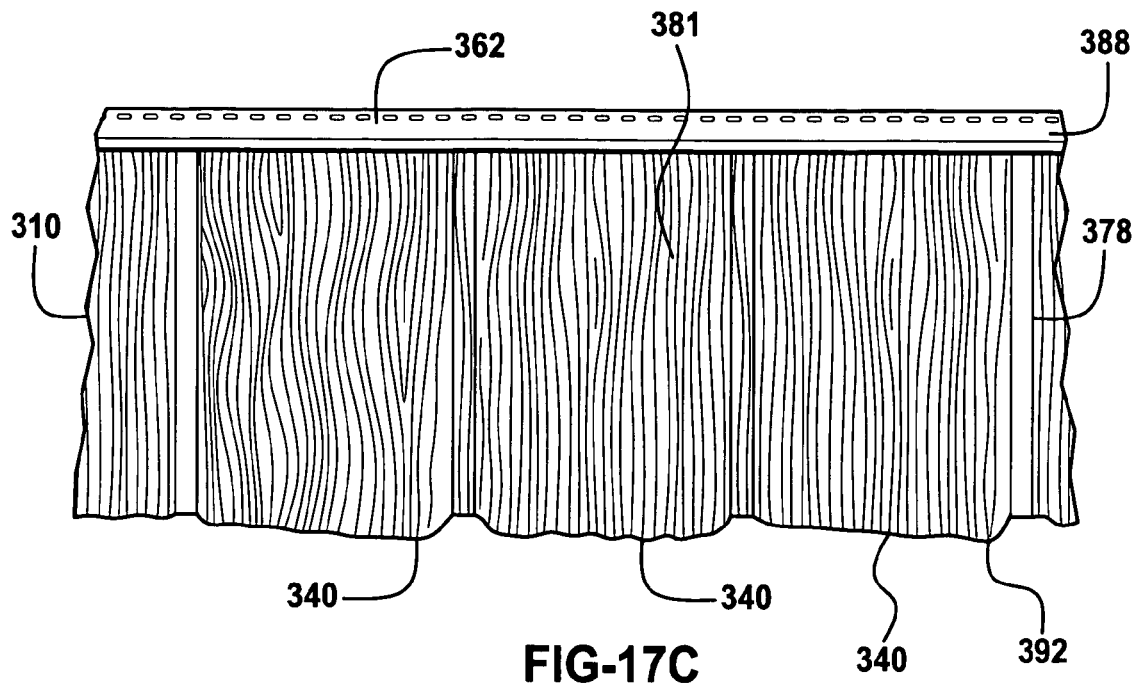
FIG. 17C is a front view of the siding panels shown in FIG. 17A.
Figure 17D:
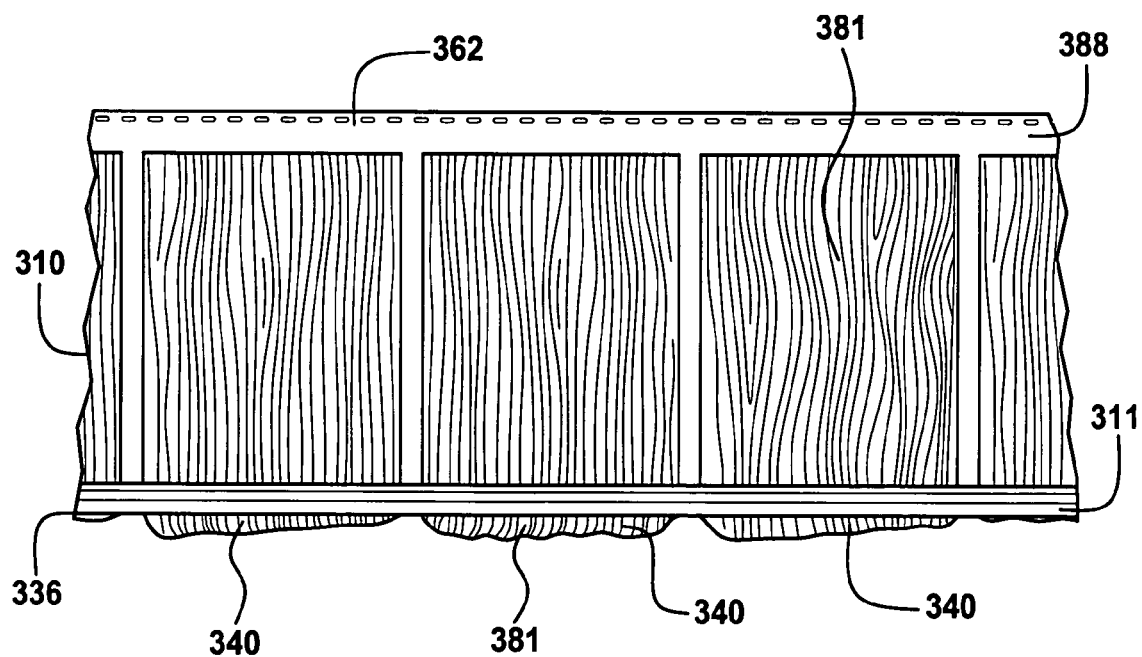
FIG. 17D is a rear view of the siding panels shown in FIG. 17A.

With reference to FIGS. 17C and 17D, the realistic appearance of the siding panels 310 can be further enhanced by extending the projection portion 340 a different amount beyond the horizontal plane within one of the mold plates 376. If each of the mold plates 376 has the projection portion 340 extending at different amounts within each mold plate 376, the siding panel 310 will have increased jaggedness. One example of the siding panel 310 having the projection portion 340 extending at different amounts in a single mold plate 376 is shown in FIG. 17C. Referring to the right-most panel, the projection portion 340 extends further on the right-hand side than it does on the left-hand side. The center-most panel has the projection portion 340 extending generally the same amount with smaller variations within the single mold plate 376. FIG. 17D is a rear view of the siding panel 310 illustrating the projection portion 340 extending beyond the lower leg 336.

The realistic appearance is further enhanced by the projection portion 340 of the adjacent mold plates 376 extending a different amount beyond the horizontal plane relative to the next adjacent mold plate 376. The difference between adjacent mold plates 376 further increases the jaggedness of the siding panel 310, thereby increasing the realistic appearance of the panel. It has been determined that if the projection portion 340 extends too far down and out from the intermediate portion 378 and the lower leg 336, the material S3 becomes to thin at the projection portion 340. Therefore, the projection portion 340 should extend at most 0.5 inches laterally beyond the horizontal plane and at most 0.5 inches vertically beyond the intermediate portion 378. Referring again to FIG. 17D, the lower edge portion 392 may also have the aesthetic pattern 381 thereon for imparting the pattern to the sheet of material S3.

Figure 18B:
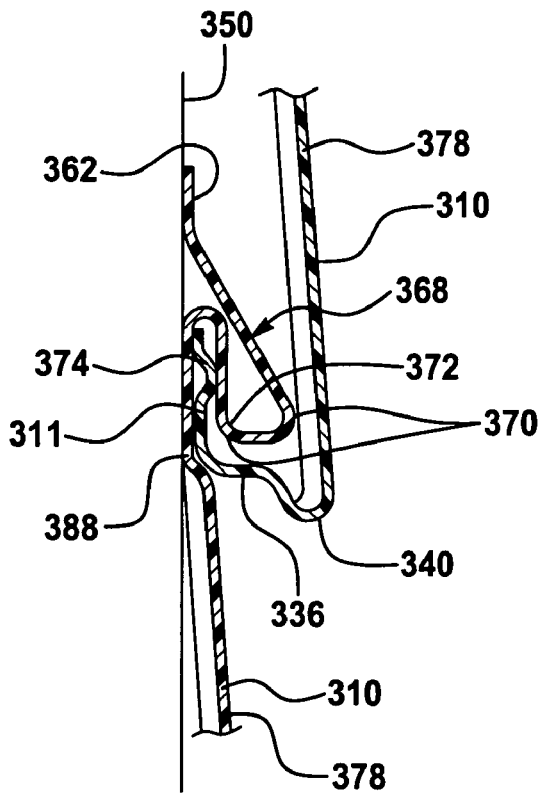
FIG. 18B is a cross-sectional view of siding panels shown in FIG. 18A and illustrating the connection of adjacent overlapping panels.

Referring back to FIGS. 17A and 17B, one embodiment of the upper edge portion 388 is illustrated. The upper edge portion 388 defines a mounting flange 362 which may include having a locking groove 364 for mating with the lower edge portion 392 of a vertically overlapping panel. The mounting flange 362 also includes slots 314 for receiving fasteners to secure to the structure 350. Referring to FIGS. 18A and 18B, another embodiment of the upper edge portion 388 is illustrated. The upper edge portion 388 includes an L-shaped projection 366 extending from the upper edge portion 388 for forming an interlock 368. The interlock 368 has two corners 370 with one of the corners 370 having a substantially right angle 372 for mating with the lower edge portion 392 of a vertically overlapping panel. The interlock 368 creates a more secure connection between adjacent siding panels 310 because the corner 370 having the right angle 372 is more difficult to unlock from the lower edge portion 392. Further, the interlock 368 allows the siding panel 310 to withstand higher winds without becoming unfastened from adjacent panels or the structure 350.

Figure 19:
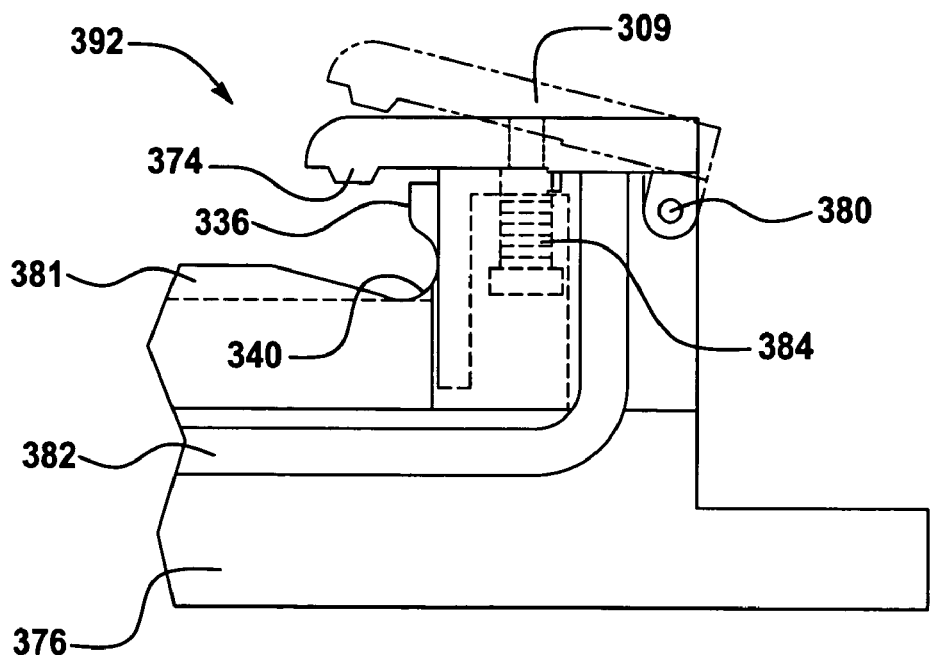
FIG. 19 is a close-up view of a lower edge portion of the mold plates having a pivotable cap for removing the sheet of material from the mold plates.

Referring to FIG. 19, the apparatus 300 includes a cap 309 extending from the lower leg 336 forming a cap leg 311 and the lower edge portion 392 having a generally C-shape. The cap leg 311 extends upwardly from the horizontal plane for engaging adjacent panels 310. The generally C-shaped lower edge portion 392 mates with the upper edge portion 388 of adjacent siding panels 310 when secured to the structure 350. The cap 309 includes a locking channel 374 for forming into the sheet of material S3 to secure to the upper edge portion 388 of a vertically overlapping panel. More specifically, the locking groove 364 co-acts with the locking channel 374 to secure adjacent panels to the structure 350. It is to be appreciated that the siding panels may be formed with or without the locking groove 364, while still securing fastened to adjacent panels. Further, the locking channel 374 may be removed and a locking leg 363 may be used to engage the locking groove 364. The locking leg 363 biases the cap leg 311 outwardly.

The cap 309 also includes a connector 380 pivotally connecting the cap 309 to the lower leg 336. The cap 309 is moveable between an open position and a closed position for allowing removal of the elongated siding panel 310. Application of the vacuum through the vacuum passages 382 seals the cap 309 against the lower leg 336. When the sheet of material S3 reaches the end of the conveyor 360, the sheet of material S3 is removed from the mold plates 376 and forces the cap 309 to the open position. A biasing device 384 biases the cap 309 from the open position to the closed position so that after the material S3 is removed, the biasing device 384 forces the cap 309 back to the closed position. The biasing device 384 is illustrated as a spring interconnecting the cap 309 to the lower leg 336, however, the biasing device 384 may include other devices, such as, but not limited to, actuated cylinders to move the cap 309.

Figure 20:
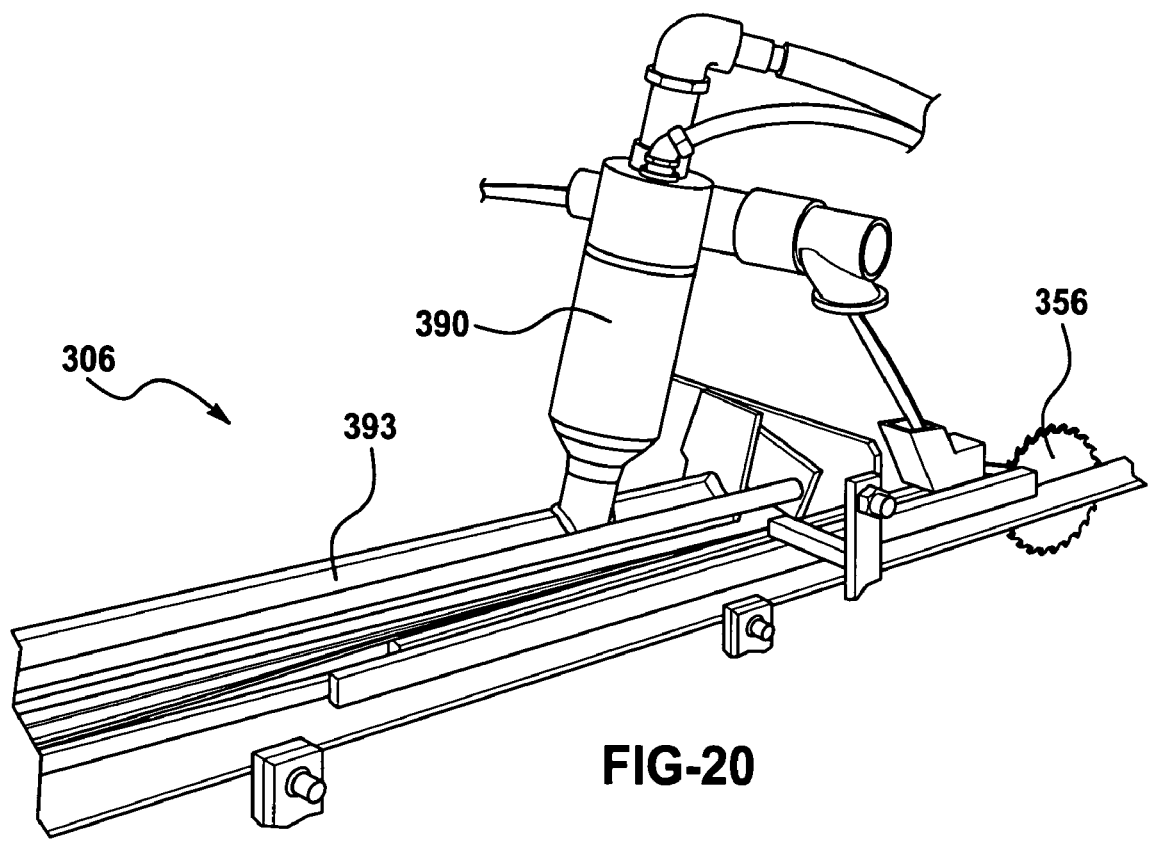
FIG. 20 is a perspective view of a bending station having a heater for heating a line along the siding panel.
Figure 21:
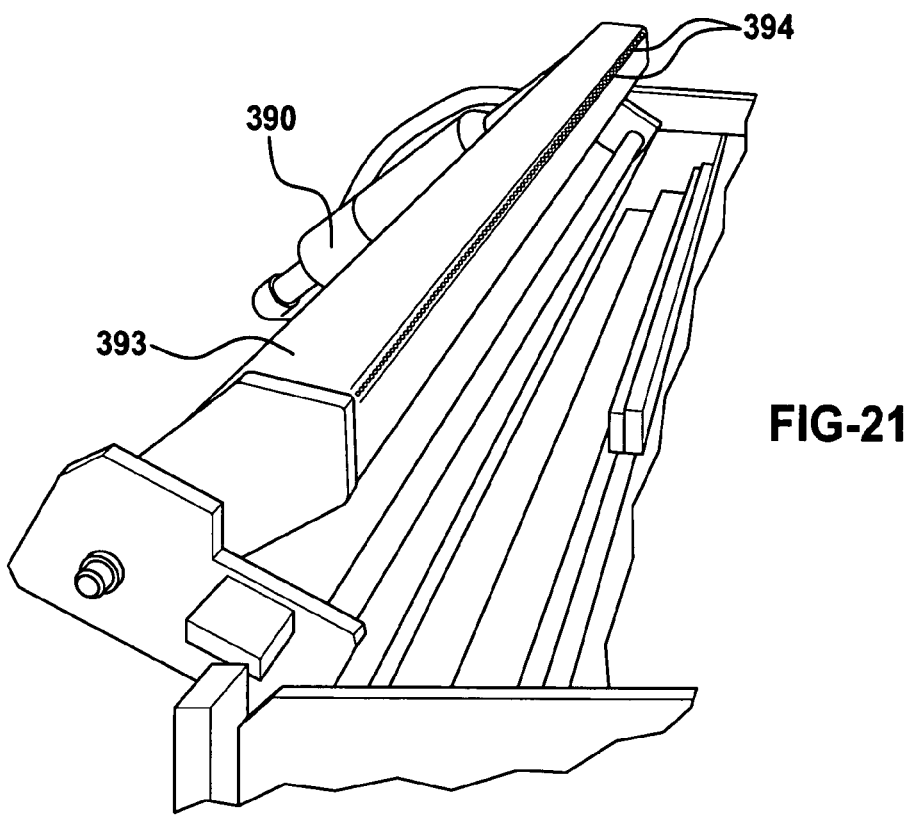
FIG. 21 is another perspective view of the heater illustrated in FIG. 20.

With reference to FIG. 20, the bending station 306 is illustrated. The bending station 306 includes a heater 390 positioned downstream from the extruder 400 for heating the sheet of material S3 after the sheet of material S3 has been removed from the mold plates 376 and after the entire sheet of material S3 has been cooled. The heater 390 further includes a manifold 393 defining a plurality of apertures 394 disposed in a straight line as illustrated in FIG. 21. The heater 390 heats a line 324 spaced inward from a terminal edge of either one of the upper and the lower edge portions 388, 392. The line 324 divides the edge portion into a first part 414 spaced inward from the line 324 and a second part 416 spaced outward from the line 324. In one preferred embodiment, only a single heater 390 is required since the lower edge portion 392 is formed while the entire sheet of material S3 is above the temperature for vacuum forming and does not require additional bending. However, both edge portions may be heated and bent to form final profiles of the edge portions.

Once the line 324 is heated along the edge portion, the bending station 306 bends the second part 416 relative to the first part 414 for finishing the edge portion. For example, referring back to FIGS. 17A and 17B, the details of the upper edge portion 388, such as the locking groove or the interlock, are formed substantially simultaneously with the remainder of the siding panel 310. However, the upper edge portion 388 needs to be finished after it has been removed from the mold plates 376. Therefore, after the heater 390 heats the line 324, the bending station 306 bends the second part 416 relative to the first part 414 to form the profile shown in FIG. 17B.

Figure 22:
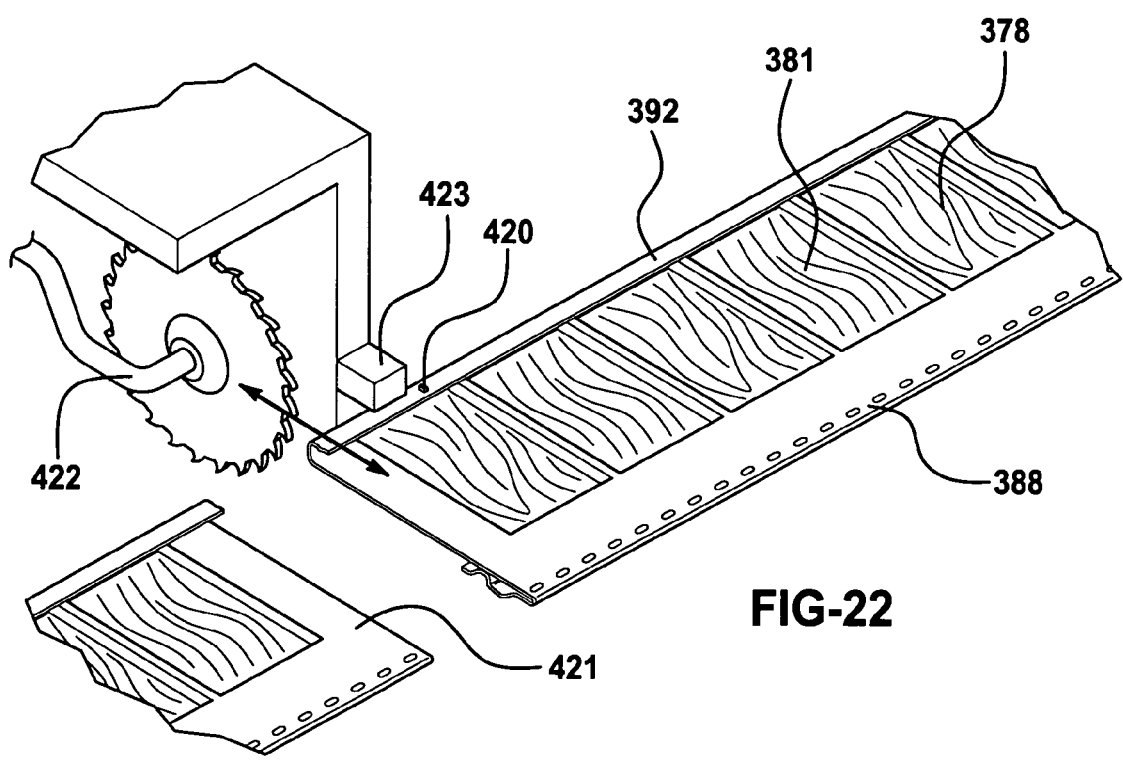
FIG. 22 is a perspective view of a finishing station having a cutting mechanism for sectioning the elongated siding panel.

Referring to FIG. 22, a micro-switch cam 420 is disposed in one of the upper edge portion 388 and the lower edge portion 392 at longitudinally spaced intervals for activating a cutting mechanism 422 to cut the sheet of material S3 into a succession of separate elongated siding panels 310. As the micro-switch cam 420 approaches the cutting mechanism 422, a micro-switch 423 detects the micro-switch cam 420 and activates the cutting mechanism 422. The cutting mechanism 422 secures the sheet of material S3 by slowing or stopping the material S3 and then the material S3 is cut. The micro-switch cam 420 is formed into the sheet of material S3 by the mold plates 376 while the sheet of material S3 is above the temperature for vacuum forming.

Referring to the example described above having eight mold plates 376 forming one siding panel 310, the micro-switch cam 420 may be located every eighth mold plates 376. Those skilled in the art recognize that if the siding panel 310 is to be cut into ten foot sections, then sixteen mold plates 376 may form one siding panel 310 and the micro-switch cam 420 would be located every sixteenth mold plate 376. The mold plate 376 that divides the lengths of the siding panels 310 may be further defined as a divider plate 421 that is substantially flat and that only includes the micro-switch cam 420 and does not have an aesthetic pattern 381 disposed thereon. The cutting mechanism 422 does not cut the siding panel 310 in the aesthetic pattern 381 but only where the siding panel 310 does not have the aesthetic pattern 381. The substantially flat section would be hidden by adjacent siding panels 310 during use. In FIG. 15, the finishing station also includes a punch 312 for punching slots 314 into the mounting flange 362.

Another embodiment of the apparatus 300 is shown in FIG. 23 and includes a plug assist 402 adjacent the conveyor 360. The plug assist 402 urges the sheet of material S3 into at least one of the intermediate portion 378, the upper edge portion 388, and the lower edge portion 392 as the sheet of material S3 is vacuum formed. The plug assist 402 preferably includes a plurality of mold inserts 404 rotatably engaging adjacent mold plates 376 as the conveyor 360 is operated. Other prior art plug assists limit the rate of speed that the conveyor 360 is able to operate because the plug assist 402 has to be reset each time. The plug assist 402 according to the subject invention moves at the same speed of the conveyor 360 and therefore the conveyor 360 can be operated at maximum speeds. In the embodiment shown in FIG. 23, the plug assist 402 is a wheel having mold inserts 404 about the circumference of the wheel.

Referring to FIG. 24, the plug assist 402 is illustrated in more detail. The plug assist 402 includes a shaft 406 fixed relative to the conveyor 360 that supports the plurality of mold inserts 404 substantially horizontally for rotation about the shaft 406. In one embodiment, a common drive 408 connects to the conveyor 360 and the shaft 406 for driving the conveyor 360 and the shaft 406 simultaneously. Alternatively, the shaft 406 may be driven by a drive separate from the conveyor 360.

Figure 25:
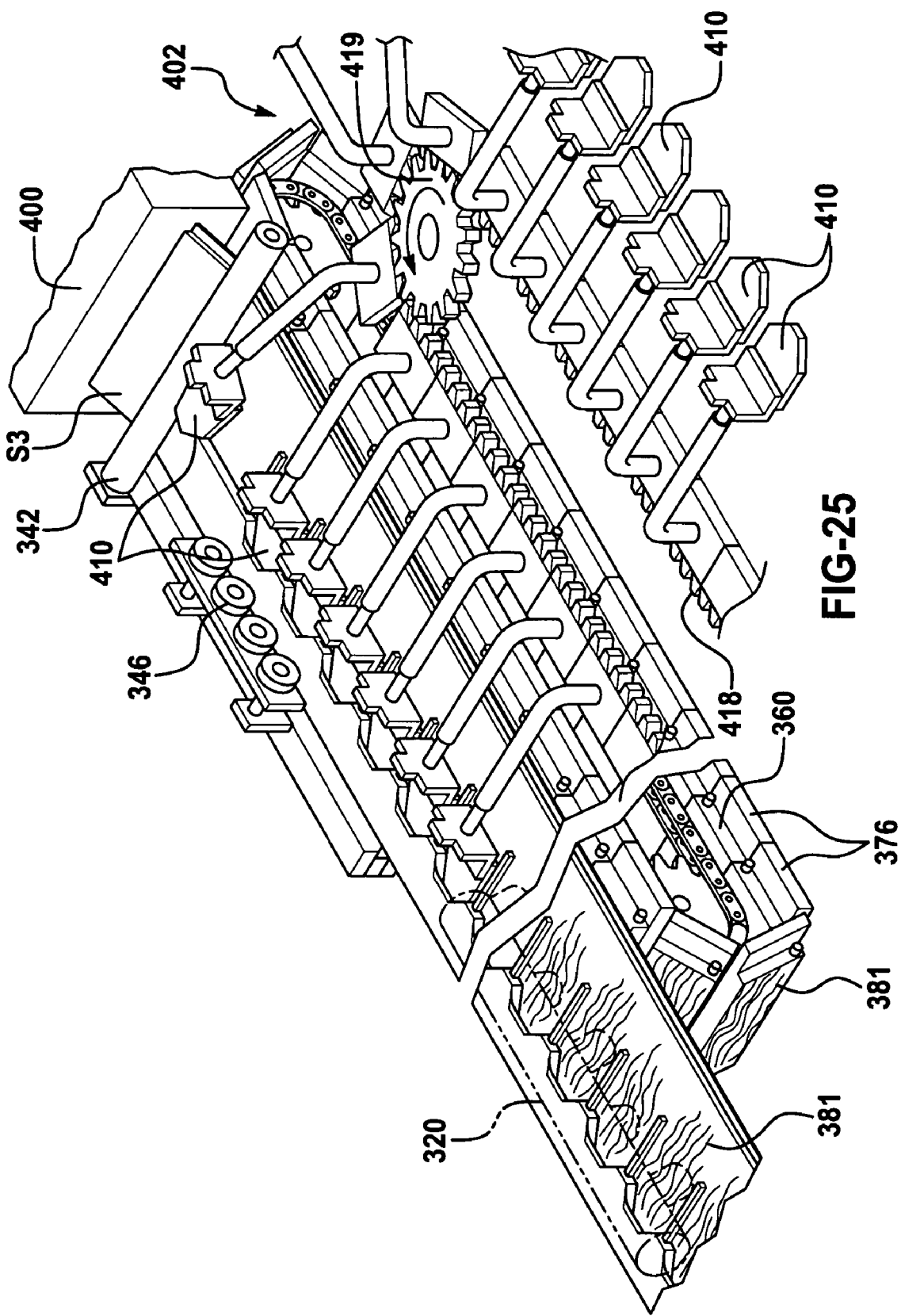
FIG. 25 is a perspective view of yet another embodiment of the forming station having another embodiment of the plug assist.

Another embodiment shown in FIG. 25 includes a plurality of separate and distinct mold inserts 410 that travel along with the conveyor 360. The mold inserts 410 are urged into contact with the sheet of material S3 by following a track 418. The mold inserts 410 travel with the sheet of material S3 at the speed of the conveyor 360. At a predetermined point, the mold inserts 410 separate from the sheet of material S3 and cycle back to the beginning. The track 418 may be a chain drive 419 as illustrated in FIG. 25. The separate mold inserts 410 would travel back toward the start of the conveyor 360 in a clockwise or counterclockwise direction. At least one mold insert engages the sheet of material S3 as it travels along the conveyor 360. Preferably, there would be at least eight mold inserts 410 spaced from one another that travel with the conveyor 360.

The subject invention further provides a method of continuously producing elongated siding panels 310. Each of the panels 310 have the upper edge portion 388, the intermediate portion 378 having the aesthetic pattern 381, and the lower edge portion 392. The lower leg 336 extends substantially perpendicular from the intermediate portion 378 defining the horizontal plane and the cap leg 311 extends upwardly from the horizontal plane such the lower edge portion 392 is substantially C-shaped. The method includes the steps of extruding the sheet of material S3 having the temperature sufficient for vacuum forming and directing the sheet of material S3 onto the plurality of mold plates 376 carried by the conveyor 360.

Next, a vacuum is progressively applied to the mold plates 376 as the mold plates 376 travel along the conveyor 360 and the sheet of material S3 is drawn into the mold plates 376 when the vacuum is applied. The upper edge portion 388, the intermediate portion 378, and the lower edge portion 392 are formed while the entire sheet of material S3 has the sufficient temperature for vacuum forming. The projection portion 340 between the lower edge portion 392 and the intermediate portion 378 is also formed simultaneously with the forming of the lower edge portion 392 and the intermediate portion 378. Likewise, the cap 309 is sealed against the lower leg 336 and the locking channel 374 in the lower edge portion 392 is formed while the entire sheet of material S3 is above the temperature for vacuum forming and the locking groove 364, if present, in the upper edge portion 388 is also formed simultaneously with the formation of the locking channel 374.

After forming, the entire sheet of material S3 is cooled below the temperature sufficient for vacuum forming. If necessary, the excess material S3 is trimmed from the upper and the lower edge portions 388, 392 prior to finishing. The subject invention heats the line 324 spaced inward from a terminal edge of the upper edge portion 388. The line 324 divides the upper edge portion 388 into the first part 414 spaced inward from the line 324 and the second part 416 spaced outward from the line 324. The first part 414 and the second part 416 remain at a temperature below the temperature of the line 324 even though the line 324 has been re-heated. The second part 416 is bent relative to the first part 414 to define the interlock 368 of the upper edge portion 388.

After the upper edge portion 388 is complete, the siding panel 310 reaches the finishing station 308. The slots 314 are punched into the mounting flange 362 and then the micro-switch cam 420 is detected and the sheet of material S3 is cut at longitudinally spaced intervals to produce the succession of separate elongated siding panels 310 in response to detecting the micro-switch cam 420.

While the methods and forms of apparatus and the siding panels herein described constitute preferred embodiments of the invention, it is to be understood that the invention is not limited to the precise methods and forms of apparatus and siding panels described, and that changes may be made therein without departing from the scope and spirit of the invention as defined in the appended claims. For example, it is within the scope of the invention to produce siding panels with a single elongated mold plate for each elongated siding panel and attach forward end portions of the mold plates to one pair of endless conveyor chains and the rearward end portions of the mold plates to another pair of endless conveyor chains so that the mold plates always remain horizontal as they travel with the endless conveyor chains.

What is claimed is:

1. An apparatus for continuously producing elongated siding panels, said apparatus comprising:
    a conveyor;
    a plurality of mold plates formed of a rigid material adjacent one another and supported by said conveyor for forming the elongated siding panels;
    a die for extruding a sheet of material onto said mold plates;
    each of said mold plates having an upper edge portion and a lower edge portion with an intermediate portion therebetween;
    a plurality of vacuum passages disposed within each of said intermediate portion, said upper edge portion, and said lower edge portion for vacuum-forming said sheet onto said mold plates;
    said intermediate portion having an aesthetic pattern for imparting said pattern to said sheet of material with said adjacent mold plates having different aesthetic patterns;
    said lower edge portion having a lower leg extending substantially perpendicular from said intermediate portion defining a horizontal plane; and
    a projection portion between said lower edge portion and said intermediate portion extending beyond said horizontal plane for imparting a jagged pattern to said intermediate portion.

2. An apparatus as set forth in claim 1 wherein said projection portion angles upwardly at an angle of less than ninety degrees from said intermediate portion toward said lower leg.

3. An apparatus as set forth in claim 2 wherein said projection portion is further defined as having a rounded nose.

4. An apparatus as set forth in claim 1 wherein said projection portion extends a different amount beyond said horizontal plane within one of said mold plates such that said mold plate has increased jaggedness.

5. An apparatus as set forth in claim 1 wherein said lower leg is collinear along each of said adjacent mold plates.

6. An apparatus as set forth in claim 5 wherein said projection portion of said adjacent mold plates extends a different amount beyond said horizontal plane relative to said next adjacent mold plate for increasing the jaggedness of the panel.

7. An apparatus as set forth in claim 1 wherein said lower edge portion is further defined as having an aesthetic pattern thereon for imparting said pattern to said sheet of material.

8. An apparatus as set forth in claim 1 further comprising a cap extending from said lower leg forming a cap leg extending upwardly from said horizontal plane such that said lower edge portion has a generally C-shape.

9. An apparatus as set forth in claim 8 wherein said cap is further defined as having a connector pivotally connecting said cap to said lower leg moveable between an open position and a closed position for allowing removal of the elongated siding panel.

10. An apparatus as set forth in claim 9 further comprising a biasing device biasing said cap from said open position to closed position.

11. An apparatus as set forth in claim 8 wherein said cap further comprises a locking channel for forming into said sheet of material to secure said upper edge portion of a vertically overlapping panel.

12. An apparatus as set forth in claim 11 wherein said upper edge portion defines a mounting flange having a locking groove for mating with said lower edge portion of a vertically overlapping panel.

13. An apparatus as set forth in claim 1 further comprising a plug assist adjacent said conveyor urging said sheet of material into at least one of said intermediate portion, said upper edge portion, and said lower edge portion as said sheet of material is vacuum formed.

14. An apparatus as set forth in claim 13 wherein said plug assist is further defined as having a plurality of mold inserts rotatably engaging adjacent mold plates as said conveyor is operated.

15. An apparatus as set forth in claim 14 wherein said plug assist further comprises a shaft fixed relative to said conveyor and supporting said plurality of mold inserts for rotation about said shaft.

16. An apparatus as set forth in claim 15 further comprising a common drive connected to said conveyor and said shaft for driving said conveyor and said shaft simultaneously.

17. An apparatus as set forth in claim 1 further comprising a micro-switch cam disposed in one of said upper edge portion and said lower edge portion at longitudinally spaced intervals for activating a cutting mechanism to cut said sheet of material into a succession of separate elongated siding panels.

18. An apparatus as set forth in claim 17 wherein said micro-switch cam is further defined as formed between said aesthetic patterns of adjacent mold plates.

19. An apparatus as set forth in claim 1 further comprising an L-shaped projection extending from said upper edge portion for forming an interlock.

20. An apparatus as set forth in claim 19 wherein said interlock has two corners with one of said corners having a substantially right angle for mating with said lower edge portion of a vertically overlapping panel.

21. An apparatus as set forth in claim 1 further comprising a heater positioned downstream from said extruder for heating said sheet of material after said sheet of material has been removed from said mold plates.

22. An apparatus as set forth in claim 21 wherein said heater further comprises a manifold defining a plurality of apertures disposed in a straight line and heating a line spaced inward from a terminal edge of either one of said upper and said lower edge portions such that said edge portion has a first part spaced inward from said line and a second part spaced outward from said line.

23. An apparatus as set forth in claim 22 further comprising a bending station downstream from said heater for bending said second part relative to said first part for finishing said edge portion.

24. A mold plate for use in forming elongated siding panels having varied aesthetic patterns from a sheet of material, said mold plate comprising:
an upper edge portion and a lower edge portion with an intermediate portion therebetween;
a plurality of vacuum passages disposed within each of said intermediate portion, said upper edge portion, and said lower edge portion for vacuum-forming the sheet of material onto said mold plate;
said intermediate portion having an aesthetic pattern for imparting said pattern to the sheet of material;
said lower edge portion having a lower leg extending substantially perpendicular from said intermediate portion defining a horizontal plane; and
a projection portion between said lower edge portion and said intermediate portion extending beyond said horizontal plane for imparting a jagged pattern to said intermediate portion.

25. A mold plate as set forth in claim 24 wherein said projection portion angles upwardly at an angle of less than ninety degrees from said intermediate portion toward said lower leg.

26. A mold plate as set forth in claim 25 wherein said projection portion is further defined as having a rounded nose.

27. A mold plate as set forth in claim 24 wherein said projection portion extends a different amount beyond said horizontal plane within said mold plate such that said mold plate has increased jaggedness.

28. A mold plate as set forth in claim 24 wherein said lower edge portion is further defined as having an aesthetic pattern thereon for imparting said pattern to the sheet of material.

29. A mold plate as set forth in claim 24 further comprising a cap extending from said lower leg forming a cap leg extending upwardly from said horizontal plane such that said lower edge portion has a generally C-shape.

30. A mold plate as set forth in claim 29 wherein said cap is further defined as having a connector pivotally connecting said cap to said lower leg such that said cap is moveable between an open position and a closed position for allowing removal of the elongated siding panel.

31. A mold plate as set forth in claim 30 further comprising a biasing device biasing said cap from said open position to said closed position.

32. A mold plate as set forth in claim 31 wherein said cap further comprises a locking channel for securing said upper edge portion of a vertically overlapping panel.

33. A mold plate as set forth in claim 32 wherein said upper edge portion defines a mounting flange having a locking groove for mating with said lower edge portion of a vertically overlapping panel.

34. A mold plate as set forth in claim 24 further comprising an L-shaped projection extending from said upper edge portion for forming an interlock.

35. A mold plate as set forth in claim 34 wherein said interlock has two corners with one of said corners having a substantially right angle for mating with said lower edge portion of a vertically overlapping panel.

36. An apparatus for continuously producing elongated siding panels, said apparatus comprising:
a conveyor; a plurality of mold plates formed of a rigid material adjacent one another and supported by said conveyor for forming the elongated siding panels;
a die for extruding a sheet of material onto said mold plates;
each of said mold plates having an upper edge portion and a lower edge portion with an intermediate portion therebetween;
a plurality of vacuum passages disposed within each of said intermediate portion, said upper edge portion, and said lower edge portion for vacuum-forming said sheet onto said mold plates;
said intermediate portion having an aesthetic pattern for imparting said pattern to said sheet of material with said adjacent mold plates having different aesthetic patterns;
said lower edge portion having a lower leg extending substantially perpendicular from said intermediate portion defining a horizontal plane; and
a plug assist adjacent said conveyor having a plurality of mold inserts rotatably engaging adjacent mold plates as said conveyor is operated urging said sheet of material into at least one of said intermediate portion, said upper edge portion, and said lower edge portion as said sheet of material is vacuum formed.

37. An apparatus as set forth in claim 33 wherein said plug assist further comprises a shaft fixed relative to said conveyor and supporting said plurality of mold inserts for rotation about said shaft.

38. An apparatus as set forth in claim 37 further comprising a common drive connected to said conveyor and said shaft for driving said conveyor and said shaft simultaneously.

39. An apparatus for continuously producing elongated siding panels, said apparatus comprising:
a conveyor; a plurality of mold plates formed of a rigid material adjacent one another and supported by said conveyor for forming the elongated siding panels;
a die for extruding a sheet of material onto said mold plates;
each of said mold plates having an upper edge portion and a lower edge portion with an intermediate portion therebetween;
a plurality of vacuum passages disposed within each of said intermediate portion, said upper edge portion, and said lower edge portion for vacuum-forming said sheet onto said mold plates;
said intermediate portion having an aesthetic pattern for imparting said pattern to said sheet of material with said adjacent mold plates having different aesthetic patterns;
said lower edge portion having a lower leg extending substantially perpendicular from said intermediate portion defining a horizontal plane; and
an L-shaped projection extending from said upper edge portion for forming an interlock.

40. An apparatus as set forth in claim 39 wherein said interlock has two corners with one of said corners having a substantially right angle for mating with said lower edge portion of a vertically overlapping panel.

41. An apparatus for continuously producing elongated siding panels, said apparatus comprising:
a conveyor; a plurality of mold plates formed of a rigid material adjacent one another and supported by said conveyor for forming the elongated siding panels;
a die for extruding a sheet of material onto said mold plates;
each of said mold plates having an upper edge portion and a lower edge portion with an intermediate portion therebetween;

a plurality of vacuum passages disposed within each of said intermediate portion, said upper edge portion, and said lower edge portion for vacuum-forming said sheet onto said mold plates;

said intermediate portion having an aesthetic pattern for imparting said pattern to said sheet of material with said adjacent mold plates having different aesthetic patterns;

said lower edge portion having a lower leg extending substantially perpendicular from said intermediate portion defining a horizontal plane; and a cap pivotally connected to and extending from said lower leg forming a cap leg extending upwardly from said horizontal plane such that said lower edge portion has a generally C-shape.

42. An apparatus as set forth in claim 41 further comprising a connector pivotally connecting said cap to said lower leg moveable between an open position and a closed position for allowing removal of the elongated siding panel.

43. An apparatus as set forth in claim 42 further comprising a biasing device biasing said cap from said open to said closed position.

44. An apparatus as set forth in claim 41 wherein said cap further comprises a locking channel for securing said upper edge portion of a vertically overlapping panel.

45. An apparatus as set forth in claim 44 wherein said upper edge portion defines a mounting flange having a locking groove for mating with said lower edge portion of a vertically overlapping panel.

* * * * *

UNITED STATES PATENT AND TRADEMARK OFFICE
CERTIFICATE OF CORRECTION

PATENT NO.         : 7,296,989 B2
APPLICATION NO. : 10/999559
DATED                 : November 20, 2007
INVENTOR(S)       : Daniel W. King Page 1 of 1

It is certified that error appears in the above-identified patent and that said Letters Patent is hereby corrected as shown below:

Column 14, line 51, please delete "fight" and insert therein --right--.

Column 16, line 22, please delete "33" and insert therein --36--.

Signed and Sealed this

First Day of April, 2008

JON W. DUDAS
*Director of the United States Patent and Trademark Office*